US007020381B1

(12) United States Patent
Kato et al.

(10) Patent No.: US 7,020,381 B1
(45) Date of Patent: Mar. 28, 2006

(54) VIDEO EDITING APPARATUS AND EDITING METHOD FOR COMBINING A PLURALITY OF IMAGE DATA TO GENERATE A SERIES OF EDITED MOTION VIDEO IMAGE DATA

(75) Inventors: Yuichi Kato, Aichiken (JP); Motoshi Suzuki, Aichiken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1038 days.

(21) Appl. No.: 09/704,548

(22) Filed: Nov. 3, 2000

(30) Foreign Application Priority Data

Nov. 5, 1999 (JP) .................................. 11-315543

(51) Int. Cl.
*H04N 5/93* (2006.01)

(52) U.S. Cl. ............................. 386/52; 386/53; 386/55; 345/629; 715/723

(58) Field of Classification Search .................. 386/52, 386/55, 53; 345/629; 715/723
See application file for complete search history.

(56) References Cited

U.S. PATENT DOCUMENTS

| 5,359,712 A | * | 10/1994 | Cohen et al. | ................ 715/723 |
| 5,440,348 A | | 8/1995 | Peters et al. | |
| 5,659,793 A | * | 8/1997 | Escobar et al. | ............. 345/629 |
| 6,477,315 B1 | * | 11/2002 | Ohomori | ..................... 345/629 |

\* cited by examiner

*Primary Examiner*—Vincent Boccio
(74) *Attorney, Agent, or Firm*—McDermott Will & Emery LLP

(57) ABSTRACT

A video editing apparatus for editing electronic motion video image data utilizes an effect setting table that specifies mapping of editing effect names arbitrarily registered by the user to editing effects or screen effects, for example, transition effects between different scenes or successive video clips and insertion of captions and subtitles, executable by the video editing apparatus. In editing management data that specify a flow of a program, editing effects to be applied in respective video clip data are set indirectly by specifying the editing effect names registered in the effect setting table. Varying the mapping of the editing effect names to the editing effects enables a desired editing effect corresponding to a certain editing effect name to be collectively changed without modifying the editing management data. This arrangement desirably relieves the labor in the process of setting the editing effects and improves the certainty.

21 Claims, 20 Drawing Sheets

Fig. 6 EFFECT SETTING TABLE — 44

| Editing Effect Names \ Programs | IDP:0001 Newscast | IDP:0002 Talk show | ... |
|---|---|---|---|
| IDE:0001 Switchover to Studio | IDC:0001 Wipe 1 | IDC:0013 Slide C | ... |
| IDE:0002 Switchover to Spot | IDC:0011 Slide A | IDC:0002 Wipe 2 | ... |
| IDE:0003 Switchover to VCR | IDC:0012 Slide B | IDC:0012 Slide B | ... |

Fig. 12

| Effects | Combining Processes |
|---|---|
| IDE:0001 Switchover to Studio | IDC:0001 Wipe 1 |
| IDE:0002 Switchover to Spot | IDC:0011 Slide A |
| IDE:0003 Switchover to VCR | IDC:0012 Slide B |
| ⋮ | ⋮ |

Fig. 15

| Cover Image Names \ Programs | IDP:0001 Newscast | IDP:0002 Talk show | ... |
|---|---|---|---|
| ID2:0001 Sponsor | IDC:0011 Sponsor A | IDC:0013 Sponsor C | ... |
| ID2:0002 Appearance | IDC:0021 Newscaster A | IDC:0022 Commentator A | ... |
| ID2:0003 Caption | IDC:0031 Telop A | IDC:0032 Telop B | ... |

| Program Title | Newscast(IDP:0001) 43a |
|---|---|
| Main Image Data | Cover Image Data |
| Scene: Opening<br><br>ID:0001<br>Start point : ****<br>End point : **** | |
| | Cover 1: Sponsor<br>ID2:0001<br>Start point : ****<br>End point : **** |
| Scene: Studio<br><br>ID:0002<br>Start point : ****<br>End point : **** | |
| | Cover 2: Caption<br>ID2:0003<br>Start point : ****<br>End point : **** |
| ⋮ | ⋮ |
| Scene: Ending<br><br>ID:0004<br>Start point : ****<br>End point : **** | |
| | Cover 3: Appearance<br>ID2:0002<br>Start point : ****<br>End point : **** |

FLOW OF PROGRAM ↓

Fig. 18

|  Programs / Intermediate Image Names | Tokyo 44d1 | Osaka 44d2 |
|---|---|---|
| ID3:0001 Sponsor A | Icm:0011 CMA1 | Icm:0012 CMA2 |
| ID3:0002 Sponsor B | Icm:0021 CMB1 | Icm:0022 CMB2 |
| ID3:0003 Sponsor C | Icm:0031 CMC1 | Icm:0032 CMC2 |

VIDEO EDITING APPARATUS AND EDITING METHOD FOR COMBINING A PLURALITY OF IMAGE DATA TO GENERATE A SERIES OF EDITED MOTION VIDEO IMAGE DATA

BACKGROUND OF THE INVENTION

1. Field of the Invention

The present invention relates to a video editing apparatus that utilizes electronic motion video image data and generates program data, for example, for television broadcasting programs.

2. Description of the Related Art

A technique that stores motion video images as electronic motion video image data in a hard disk and edits the electronic motion video image data to generate program data with the aid of a computer, that is, a non-linear editing technique, has been popularized recently. FIG. 20 shows a prior art process of non-linear editing. Here shows an exemplified screen display for non-linear editing that takes advantage of GUIs (graphical user interfaces).

In the exemplified process of non-linear editing, an editing window PW for carrying out edition and a transition effects window EW for selecting transition effects of different scenes. Motion video images, which will be the element of program data, have titles like CLIP1 and CLIP2 allocated to the respective video clips representing different scenes and are stored fragmentarily in a hard disk of a computer. In the editing window PW, motion video images used in a program and their lengths are shown on a video editing bar VB for setting main image data. The widths of the respective illustrated areas CLIP1 and CLIP2 correspond to the time periods for which the respective motion video images or video clips are displayed.

Switchover effects between the successive motion video images, such as cutting and wiping effects, are arbitrarily set on a transition effects setting bar EB. Each of these effects is set by dragging and dropping a corresponding icon displayed in the transition effects window EW through an operation of a mouse or another input device as shown by the arrow in FIG. 20. In response to an input command for carrying out the edition according to the settings, motion video images CLIP1 through CLIP 6 are played back on the display of the computer with the preset transition effects between the respective pairs of successive video clips. The edited series of motion video images may be recorded on a video tape or another recording medium.

The non-linear editing technique also allows a user to insert a cover image into a desired video clip on a cover image bar CB, in addition to the transition of the respective motion video images or video clips. When captions or telop (television opaque projection) are specified as cover images, an output composite image includes the captions or telop superimposed on the clips specified on the video editing bar VB.

If an identical editing effect, for example, a transition effect or a screen effect is used at a plurality of different positions, the prior art non-linear editing technique requires specification of the identical editing effect individually at the respective positions. In the example of FIG. 20, the same transition effect 'CUT' is used at three different positions among the six transition effects. This transition effect 'CUT' must be specified individually. In the case where the user desires to change the transition effect 'CUT' at all the three positions to another transition effect, it is required to specify the new transition effect again individually at these three positions.

In general, the same transition effect is frequently used in the similar circumstances in one program. For example, in the case of television broadcasting, an identical transition effect is typically applied in common for transition between the scene at a studio and other scenes. Another identical transition effect is typically applied in common for transition between the main video film and advertising films. In the prior art non-linear editing technique, the transition effect must be set individually on each occasion of transition between successive video images as discussed above. When the user desires to change the type of the transition effect, the prior art non-linear editing technique accordingly requires specification of the new transition effect individually at the respective positions. This is extremely troublesome and labor-consuming. This also leads to a higher possibility of mistakes in the process of changing the transition effects. The change of the transition effects is frequently required in the process of editing a program and in the case of reusing the previously generated program data for another program. The prior art non-linear editing technique imposes a heavy workload, because of the reasons discussed above.

This problem arises not only in the process of setting the transition effects but also in the process of setting cover images superimposed on the program, such as telop, captions, and subtitles, or intermediate images inserted into the program, such as commercials, spots, and other advertising films. If an identical cover image or intermediate image, for example, an image of presenting sponsors, is used at a plurality of different positions in one program, the prior art non-linear editing apparatus requires specification of the identical cover image or intermediate image individually at the respective positions. A heavy workload is accordingly imposed when the cover image or intermediate image is to be replaced, for example, to change a sponsor. In the process of editing a motion video, the main image may be subjected to various effects, such as the adjustment of the lightness and the tone and special effects like mosaic. A similar problem to that discussed above also arises in the case of specifying such effects.

SUMMARY OF THE INVENTION

The object of the present invention is thus to improve the workability and the certainty in the process of setting the editing effects applied in motion video image data, thereby enhancing the usability of a video editing apparatus.

At least part of the above and the other related objects is attained by a video editing apparatus that combines a plurality of image data including at least one motion video image data with one another to generate a series of edited motion video image data. The video editing apparatus includes: an image data memory that stores the plurality of image data; an effect setting memory that stores one-to-one mapping of editing effect names used in an editing process to editing effects applied in the series of edited motion video image data; an editing management data memory that stores editing management data, which specify the image data included in the series of edited motion video image data and the editing effect name in a time series; an image editing unit that applies the editing effect according to the editing management data, based on the mapping stored in the effect setting memory, so as to generate the series of edited motion video image data; and a modification unit that enables a user to modify the mapping stored in the effect setting memory.

In the video editing apparatus of the present invention, the editing effect is set indirectly by specifying the editing effect name registered in the effect setting memory. Namely varying the mapping of the editing effect names to the editing effects enables a desired editing effect applied to the video image data to be changed without modifying the editing management data. The editing management data are set by using the same editing effect name at all the positions that require the same editing effect. This arrangement enables the same editing effect at a plurality of different positions to be changed simultaneously, thus improving the workability and the certainty in the process of setting the editing effects in the course of editing the motion video.

The editing effects here include a variety of effects affecting the results of edition; for example, the adjustment of the lightness and the tone of the video image, a transition effect applied in a transition between different scenes or successive video clips, and an auxiliary image superimposed on a main image. In the specification hereof, these effects applied to the main image of the edited motion video image data are generally called the screen effects. The editing effects include insertion images inserted between the different scenes or successive video clips, in addition to these screen effects. In the specification hereof, the insertion image represents image data to be inserted irrespective of the main image data that determine a story or a flow of the series of edited motion video image data. The insertion images include blackout images and other effect images applied at the time of changing the scene and advertising films like commercials and spots.

FIG. 1 shows the concept of the present invention in the case of applying the screen effects. The image data memory stores motion video image data like images A, B, C. . . . Screen effects A, B, C . . . are provided in advance to be applicable by the video editing apparatus. The mapping of editing effect names A, B, C, . . . to the screen effects A, B, C, . . . is set in the effect setting memory. In the example of FIG. 1, the editing effect name A is mapped to the screen effect B, whereas the editing effect names B and C are mapped to the screen effect A. The modification unit allows the user to edit the mapping. The image data constituting the series of edited motion video image data and the editing effect names are set in a time series in the editing management data memory.

The image editing unit controls the respective constituents and units described above and implements edition of a motion video based on the editing management data. In the example of FIG. 1, the screen effect B is applied at all the positions where the editing effect name A is specified, based on the information stored in the effect setting memory. The technique of the present invention carries out edition of a motion video in this manner. Varying the screen effect mapped to the editing effect name A in the effect setting memory thus enables the screen effect applied at the two different positions where the editing effect name A is specified in the editing management data to be changed simultaneously.

It is not impossible to uniformly change a certain screen effect in the prior art video editing apparatus that individually specifies the same screen effect at a plurality of different positions. In this case, the certain screen effect can be changed uniformly by varying the contents of the processing carried out as the screen effects A, B, and C without modifying the editing management data. This arrangement, however, disadvantageously causes the screen effects at the positions requiring no change to be changed uniformly. The arrangement of the present invention, on the other hand, advantageously enables the screen effect to be changed at only the selected positions by indirect specification. In the example of FIG. 1, both the editing effect names B and C are mapped to the screen effect A. In the case where the contents corresponding to the editing effect name B need changing to the screen effect C, the screen effect A is changed to the screen effect C only at the positions having the editing effect name B, whereas the screen effect A is kept unchanged at the positions having the editing effect name C.

As described previously, in the present invention, the screen effects include the effects applied to one image data, for example, the adjustment of the lightness and the tone, and those applied to a plurality of image data. In the latter case, the editing effect name may be mapped to the type of the processing, the image data of interest to be processed, and both in the effect setting memory.

The processing applied to the plurality of image data includes transition effects applied in a transition between two different scenes or successive video clips, such as wiping, sliding, and cutting, and superimposing effects to superimpose an auxiliary image like telop or captions on part of the main image. The image data of interest should include at least one motion video image data. The processing accordingly includes not only composition of motion video images but composition of a motion video image and a still video image.

For example, when the screen effect represents a transition effect applied in a transition from one image data to another image data, the effect setting memory stores the mapping of the editing effect name to the transition effect. When the screen effect represents a superimposing effect applied to superimpose auxiliary image data on part of main image data, the effect setting memory stores the mapping of the editing effect name to the auxiliary image data. One example of the auxiliary image data is caption data. The editing effect name may be mapped to both the type of the processing and the auxiliary image data. One example of this application switches over the screen display to a title credit of a program with a predetermined transition effect.

In the present invention, the editing effects include insertion of a intermediate image between a plurality of image data included in the series of edited motion video image data. In this case, for example, the mapping of the editing effect name to the intermediate image is stored in the effect setting memory. The liking image to be applied is readily changed by varying the mapping.

In the video editing apparatus of the present invention, the effect setting memory may relate the editing effect name to the editing effect by one-to-one mapping or alternatively map a plurality of parameters including the editing effect name to the editing effect.

This arrangement ensures the flexible settings of the mapping of the editing effect names to the editing effects. For example, not only the editing effect name like 'opening' but another parameter like 'program title' is mapped to a single editing effect. In this case, the editing effect is specified by the two parameters, that is, the editing effect name 'opening' and another parameter 'program title'. This arrangement enables the application of the editing effect to be changed for each program according to the requirements, thus ensuring the flexible use of the editing effects. The parameters used here are not restricted to the 'program title' but may include time parameters like season, date, month, and year, those representing the type of the program like drama and newscast, language parameters like Japanese broadcasting and bilingual broadcasting, and a variety of other parameters.

In the video editing apparatus of the present invention, in order to improve the practical usability, it is desirable that the effect setting memory has an effect setting template in which a predetermined editing effect name is mapped to a predetermined editing effect. This corresponds to the initial setting of the effect setting memory. The user adequately customizes the effect setting template. This enables the user to readily change the mapping stored in the effect setting memory to satisfy the user's requirements. Providing a plurality of different effect setting templates for different purposes, for example, for the purpose of editing dramas and for the purpose of editing newscasts further improves the usability of the video editing apparatus.

The object of the present invention may be attained by another configuration as discussed below.

The present invention is accordingly directed to another video editing apparatus that combines a plurality of image data including at least one motion video image data with one another to generate a series of edited motion video image data. This video editing apparatus includes: an effect setting display unit that displays mapping of an editing effect name used in an editing process to an editing effect applied in the series of edited motion video image data; an editing management data setting unit that sets editing management data, which specify the image data and the editing effect name in a time series; and an effect modification unit that enables a user to modify the mapping, so as to change the editing effect to be applied in the series of edited motion video image data.

The video editing apparatus of this configuration enables the mapping of the editing effect names to the editing effects to be readily set, and ensures the easy specification of the editing management data with the registered editing effect names. This arrangement improves the working efficiency in the process of editing a motion video.

The present invention is attained by a variety of applications other than the video editing apparatus discussed above, for example, a video editing method, a recording medium in which a program for generating edited motion video image data is recorded, a program for attaining such functions, and a variety of equivalent signals.

Available examples of the recording medium include flexible disks, CD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media.

These and other objects, features, aspects, and advantages of the present invention will become more apparent from the following detailed description of the preferred embodiments with the accompanying drawings.

BRIEF DESCRIPTION OF THE DRAWINGS

FIG. 6 shows an example of data stored in an effect setting table included in the video editing apparatus of FIG. 4;

FIG. 12 shows a first modification of the effect setting table;

FIG. 15 shows an example of data stored in a cover setting table included in the video editing apparatus of FIG. 14;

FIG. 16 shows an example of editing management data in the second embodiment;

FIG. 18 shows an example of data stored in a cover setting table included in the video editing apparatus of FIG. 17;

DESCRIPTION OF THE PREFERRED EMBODIMENTS

Figure 1:
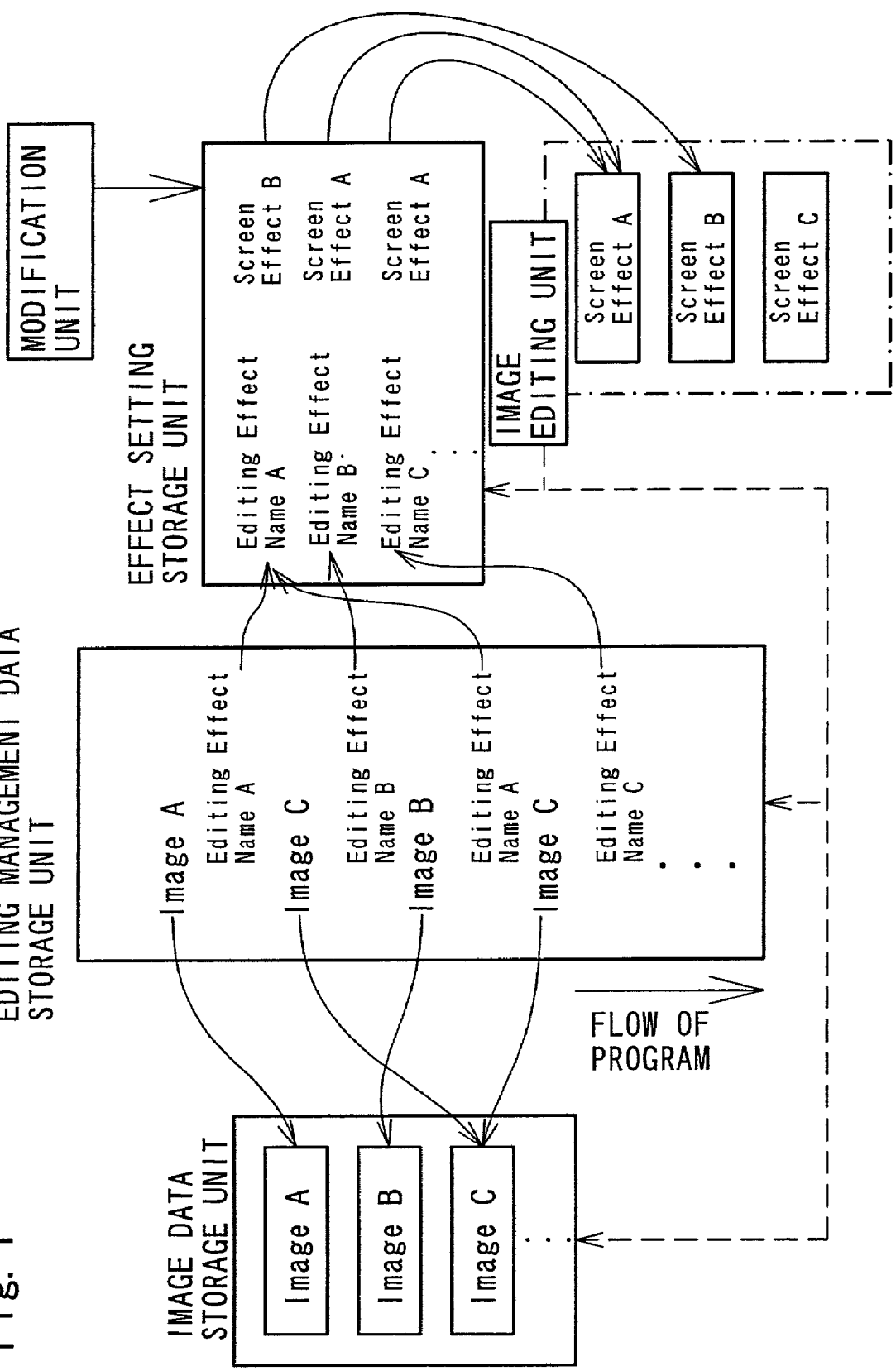
FIG. 1 shows the concept of the present invention.
Figure 2:
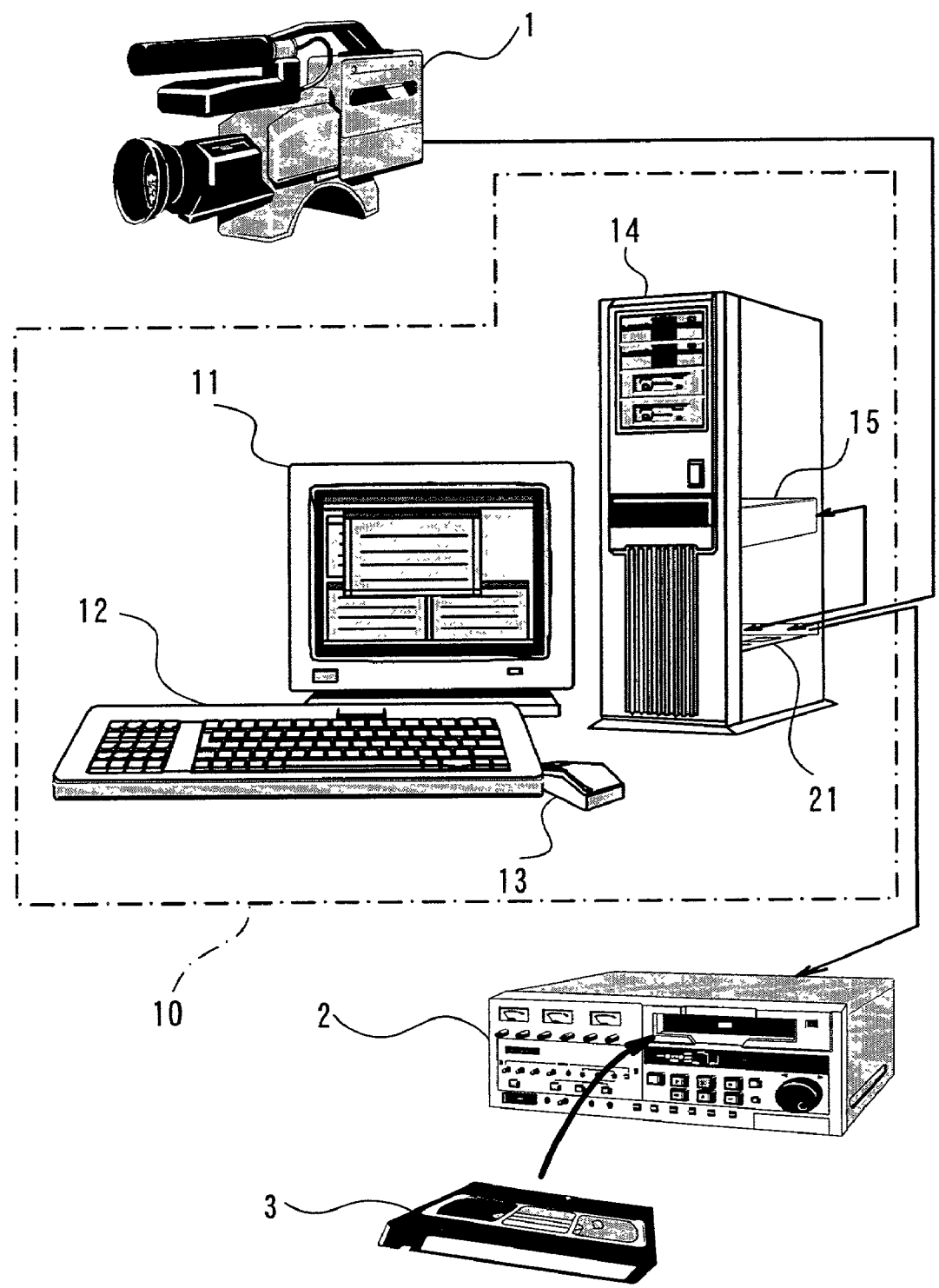
FIG. 2 illustrates the general structure of a video editing system including a video editing apparatus in a first embodiment of the present invention.

Preferred embodiments of the present invention are discussed below in the following order:

A. Structure of Apparatus
B. Functional Blocks and Data Structure
C. Screen Display
D. Generation of Edited Motion Video Image Data
E. Effects
F. Modification
G. Second Embodiment
H. Third Embodiment A. Structure of Apparatus FIG. 2 illustrates the general configuration of a video editing system in one embodiment of the present invention. The video editing system includes a computer 10 as a video editing apparatus, which is connected with a video camera 1 functioning as an input unit of motion video images, and a recorder unit 2 recording an edited motion video into a video tape 3. A main body 14 of the computer 10 includes a CPU, a RAM, a ROM, a hard disk 15 as well as a video editing board 21 that is connected with these devices via a bus. The computer 10 includes a keyboard 12 and a mouse 13 functioning as input devices that receive commands in the video editing process and a display 11 that displays windows for setting video editing information and a resulting edited motion video. The video camera 1 and the recorder unit 2 are connected to this video editing board 21. The structure of the video editing board 21 will be described later in detail.

The motion video images input from the video camera 1 are converted to digital data of a predetermined format, such as MPEG or DVCPRO, by the video editing board 21 and stored into the hard disk 15 via the bus. The computer 10 runs a software program for editing a motion video on a predetermined operating system to function as the video editing apparatus. The user edits a motion video in a screen on the display 11 through operations of the keyboard 12 and the mouse 13. The resulting edited motion video may be played back on the display 11. The edited motion video image data are converted into video signals by the video editing board 21 and output to the recorder unit 2 to be recorded on the video tape 3. The video camera 1, the recorder unit 2, and the video tape 3 may be any of the conventionally used equipment. The motion video images may be generated on the computer 10 by computer graphics or any other technique, in addition to those shots by the video camera 1.

Figure 3:
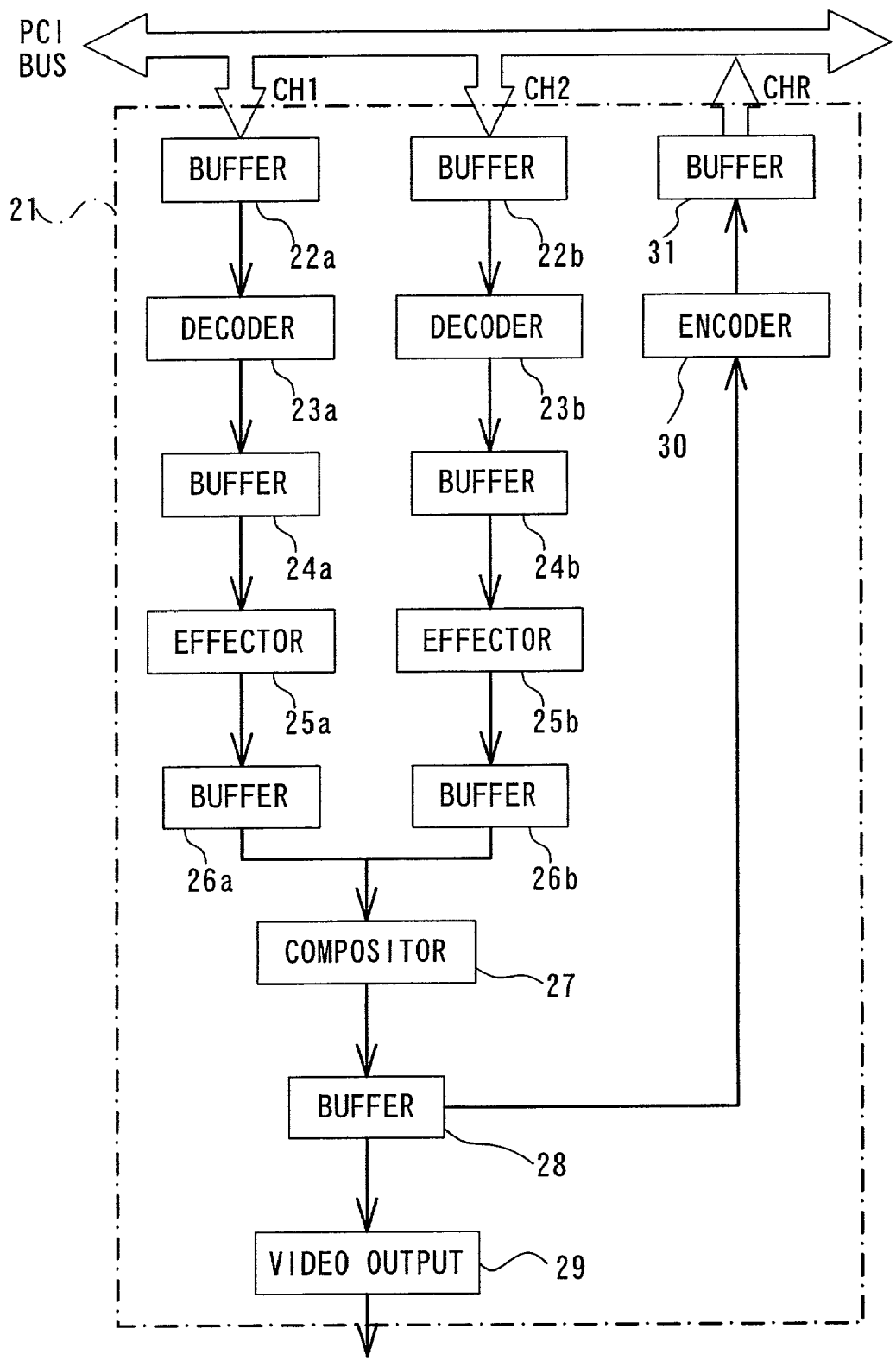
FIG. 3 schematically illustrates the structure of a video editing board included in the video editing apparatus of FIG. 2.

FIG. 3 schematically illustrates the structure of the video editing board 21. The video editing board 21 is connected to a bus, by way of example a PCI bus, of the computer 10 and has two motion video image input interfaces corresponding to two channels CH1 and CH2 and one motion video image output interface corresponding to one channel CHR. The motion video image data input from the channels CH1 and CH2 are combined with one another and output as a composite motion video according to the following flow of signals. The input motion video image data are temporarily stored in buffers 22a and 22b provided for the respective channels CH1 and CH2. The input motion video image data here represent compressed image data according to a predetermined format like MPEG or DVCPRO. In this embodiment, the buffers 22a and 22b have a storage capacity of 30 frame data, which corresponds to data for one second. The capacity can be set arbitrarily.

The motion video image data temporarily registered in the buffers 22 and 22b are successively output to decoders 23a and 23b and decompressed to data of a specific format that enables edition and playback. The decompressed image data are respectively stored in buffers 24a and 24b. The buffers 24a and 24b have a storage capacity of 1 frame data. The capacity can be set arbitrarily. The decompressed image data are subsequently output to effectors 25a and 25b to be subjected to image effects, such as the alteration of the image size and the modification of the image position, according to the requirements. The image effects are applied in response to control signals output from the CPU of the computer 10 via the PCI bus. The processed image data are stored in buffers 26a and 26b having a storage capacity of 1 frame data. The capacity can be set arbitrarily.

The 2-channel motion video images processed in the above manner are combined with each other by a compositor 27. The compositor 27 may simply lay the two-channel motion video images one upon the other or alternatively implement the combining with a variety of transition effects like wiping and sliding. The CPU of the computer 10 outputs control signals including various parameters that specify, for example, the method of composition and the transition speed of the screen display to the compositor 27 via the PCI bus. The compositor 27 carries out the combining process in response to the input control signals.

The resulting composite image is stored in a buffer 28 having a storage capacity of 1 frame data. The capacity can be set arbitrarily. A video output interface 29 converts the digital data stored in the buffer 28 into analog video signals and outputs the converted analog video signals from a video output terminal. The output video signals are transmitted to the recorder unit 2 shown in FIG. 2, so that an edited motion video is recorded on the video tape 3.

In the video editing apparatus of this embodiment, the edited motion video image data may be re-stored in the hard disk 15 of the computer 10. When the CPU of the computer 10 outputs a control signal to the video editing board 21 to specify the hard disk 15 as the destination of the output of the edited motion video image data, the motion video image data stored in the buffer 28 are output to an encoder 30. The encoder 30 converts the input motion video image data into compressed data of a predetermined format like MPEG or DVCPRO and registers the compressed data of the predetermined format into a buffer 31. The buffer 31 has a storage capacity of 30 frame data, which corresponds to data per second. The compressed motion video image data registered in the buffer 31 are successively stored into the hard disk 15 via the PCI bus. The edited motion video image data stored in the hard disk 15 may be introduced again into the video editing board 21 to be further combined with another image.

In the embodiment discussed above, the video editing board 21 is capable of receiving the motion video images of two channels. The video editing board may alternatively be constructed to be capable of receiving the motion video images of three or more channels. By repeatedly performing the edition of a motion video and storage of the edited motion video into the hard disk 15, however, the video editing board 21 for two channels implements the edition equivalent to that carried out by the video editing board for three or more channels. The structure for two channels advantageously reduces the manufacturing cost of the video editing board 21.

B. Functional Blocks and Data Structure

Figure 4:
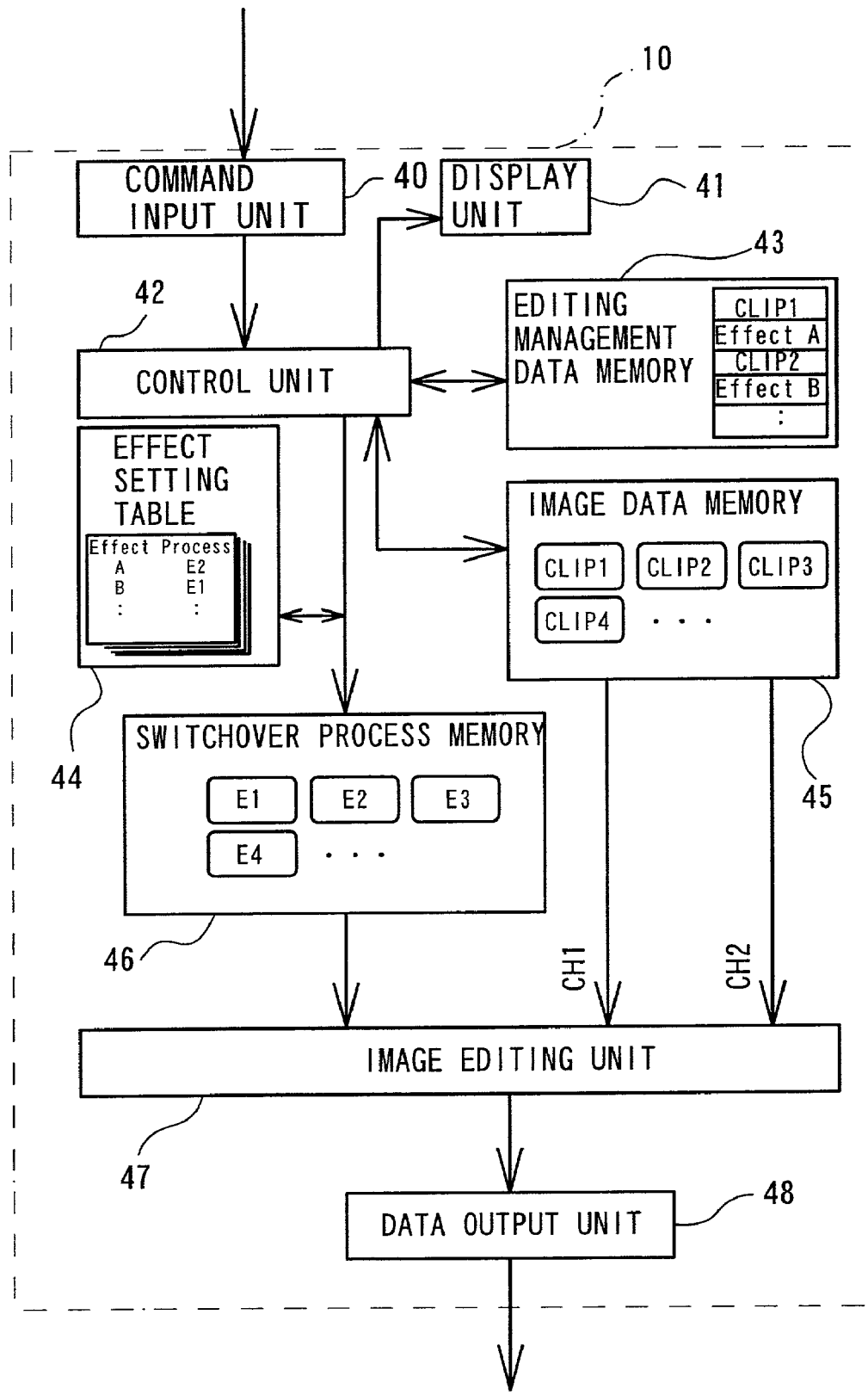
FIG. 4 shows functional blocks of the video editing apparatus in the first embodiment.

FIG. 4 shows functional blocks of the video editing apparatus of the embodiment. The video editing apparatus includes a command input unit 40, a display unit 41, a control unit 42, an editing management data memory 43, an image data memory 45, an effect setting table 44, a switchover process memory 46, an image editing unit 47, and a data output unit 48. In the structure of this embodiment, the image editing unit 47 and the data output unit 48 are attained by the video editing board 21. The editing management data memory 43, the image data memory 45, the effect setting table 44, and the switchover process memory 46 are attained by the hard disk 15, the RAM, and the other storage devices of the computer 10. The command input unit 40, the display unit 41, and the control unit 42 are attained by the keyboard 12, the mouse 13, the display 11, and the CPU, the RAM, and the ROM of the computer 10.

The command input unit 40 receives a command or a user's or editor's instruction and transmits the input command to the control unit 42. The control unit 42 reads and writes information from and into the editing management data memory 43, the effect setting table 44, and the image data memory 45. The display unit 41 causes editing information required for editing a motion video, for example, a command input window and a resulting edited motion video, to be displayed on the display 11.

Figure 5:
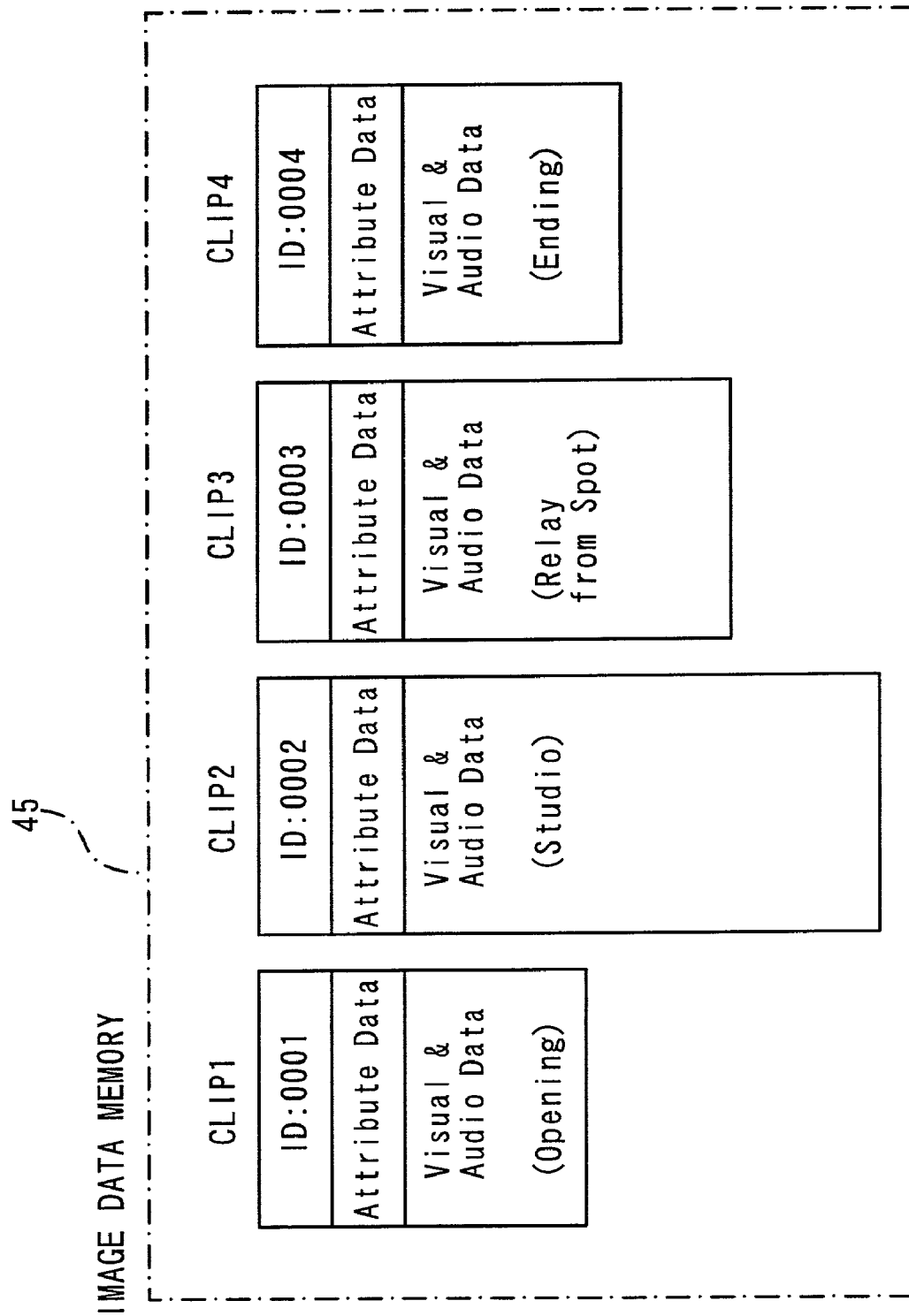
FIG. 5 shows a data structure stored in an image data memory included in the video editing apparatus of FIG. 4.

The image data memory 45 stores electronic motion video image data, which is the element of the edited motion video image data created as a program, and is attained by the RAM and the hard disk 15 of the computer 10. The image data memory 45 may alternatively be attained by another hard disk separate from the computer 10. FIG. 5 shows a data structure stored in the image data memory 45. Motion video image data CLIP1 through CLIP 4 of respective scenes or video clips used as the element are visual and audio data compressed in a predetermined format like MPEG or DVCPRO and have attribute data and indexes ID for identification. The attribute data specify the format of data compression like MPEG or DVCPRO, the type of the image data, that is, the visual data, the audio data, or the visual and audio data, and the length of the image data. In the example of FIG. 5, image data used for the opening of a program, recorded data at a studio, and a video image relayed from a spot, and image data used for the ending of the program are respectively stored as CLIP 1, CLIP 2, CLIP 3, and CLIP 4.

The effect setting table 44 sets the mapping of editing effect names A, B, . . . arbitrarily specified by the editor to transition effects E1, E2, . . . provided in advance. The transition effects include a variety of processes like cutting, wiping, sliding, fade-in, and fade-out, which are generally used for a transition between two scenes or successive video clips. The contents of the transition effects are separately stored in the switchover process memory 46. In the configuration of this embodiment, the image editing unit 47 attained by the video editing board 21 actually carries out the combining process as the transition effect. The switchover process memory 46 accordingly stores controls signals that cause the video editing board 21 to carry out a predetermined combining process including transition effects. In the case where the transition effects are applied by the software configuration, a program representing the contents of the combining process including the transition effects may be stored in the switchover process memory 46.

The contents of the effect setting table 44 and the switchover process memory 46 are described more concretely. FIG. 6 shows an example of data stored in the effect setting table 44. In the example of FIG. 6, 'Switchover to Studio', 'Switchover to Spot', and 'Switchover to VCR' are registered as editing effect names arbitrarily specified by the editor. The editing effects corresponding to the respective editing effect names are stored with indexes IDE. The transition effects like Wipe 1 and Slide A are mapped to the respective editing effects. The effect setting table 44 is a two-dimensional table, in which the editing effect names are mapped to the transition effects with regard to each program. In the example of FIG. 6, in the case of a 'program: Newscast', the 'editing effect name: Switchover to Studio', the 'editing effect name: Switchover to Spot', and the 'editing effect name: Switchover to VCR' are mapped respectively to the 'transition effect: Wipe 1', the 'transition effect: Slide A', and the 'transition effect: Slide B'. In the case of a 'program: Talk show', the 'editing effect name: Switchover to Studio' is mapped to the 'transition effect: Slide C'. Indexes IDP are allocated to the respective programs. In the effect setting table 44, one transition effect is specified by the two parameters, that is, the index IDE of the editing effect name and the index IDP of the program title.

Figure 7:
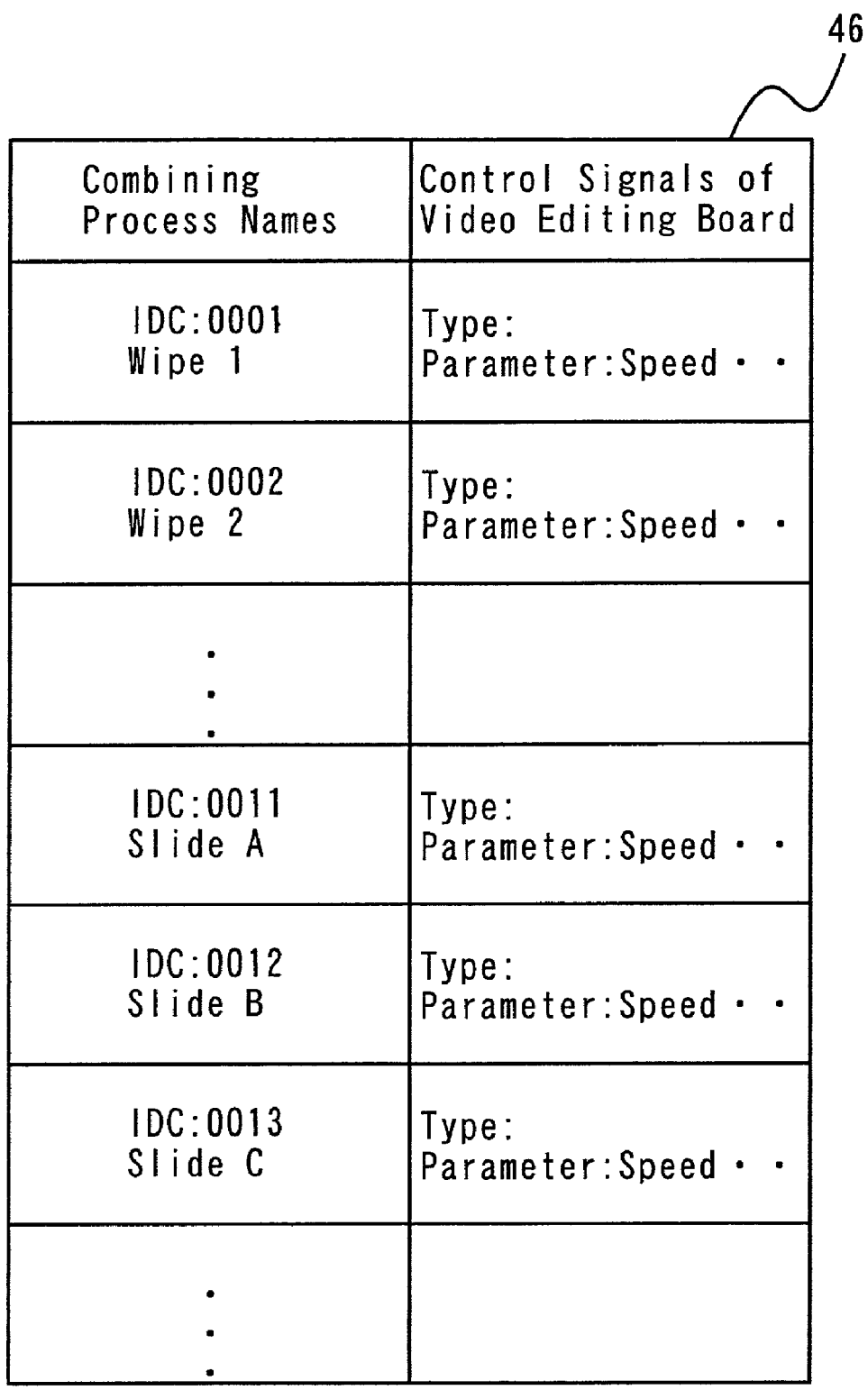
FIG. 7 shows an example of data stored in a switchover process memory included in the video editing apparatus of FIG. 4.

The contents of the respective transition effects stored in the effect setting table 44 are specified by indexes IDC. The indexes IDC represent signals to specify control signals stored in the switchover process memory 46. FIG. 7 shows an example of data stored in the switchover process memory 46. Signals representing the type of the transition effect and other parameters, for example, the speed of transition, are stored in the switchover process memory 46 as the control signals output to the video editing board 21 with regard to each transition effect like 'Wipe 1' and 'Slide A'. The contents of the respective transition effects are specified by the indexes IDC. As described above with FIGS. 6 and 7, one transition effect is specified by the two parameters, that is, the index IDE of the editing effect name and the index IDP of the program title. One index IDC allocated to the specified transition effect is then read from the effect setting table 44. Control signals to be output to the video editing board 21 corresponding to the index IDC are eventually specified in the switchover process memory 46.

Figure 8:
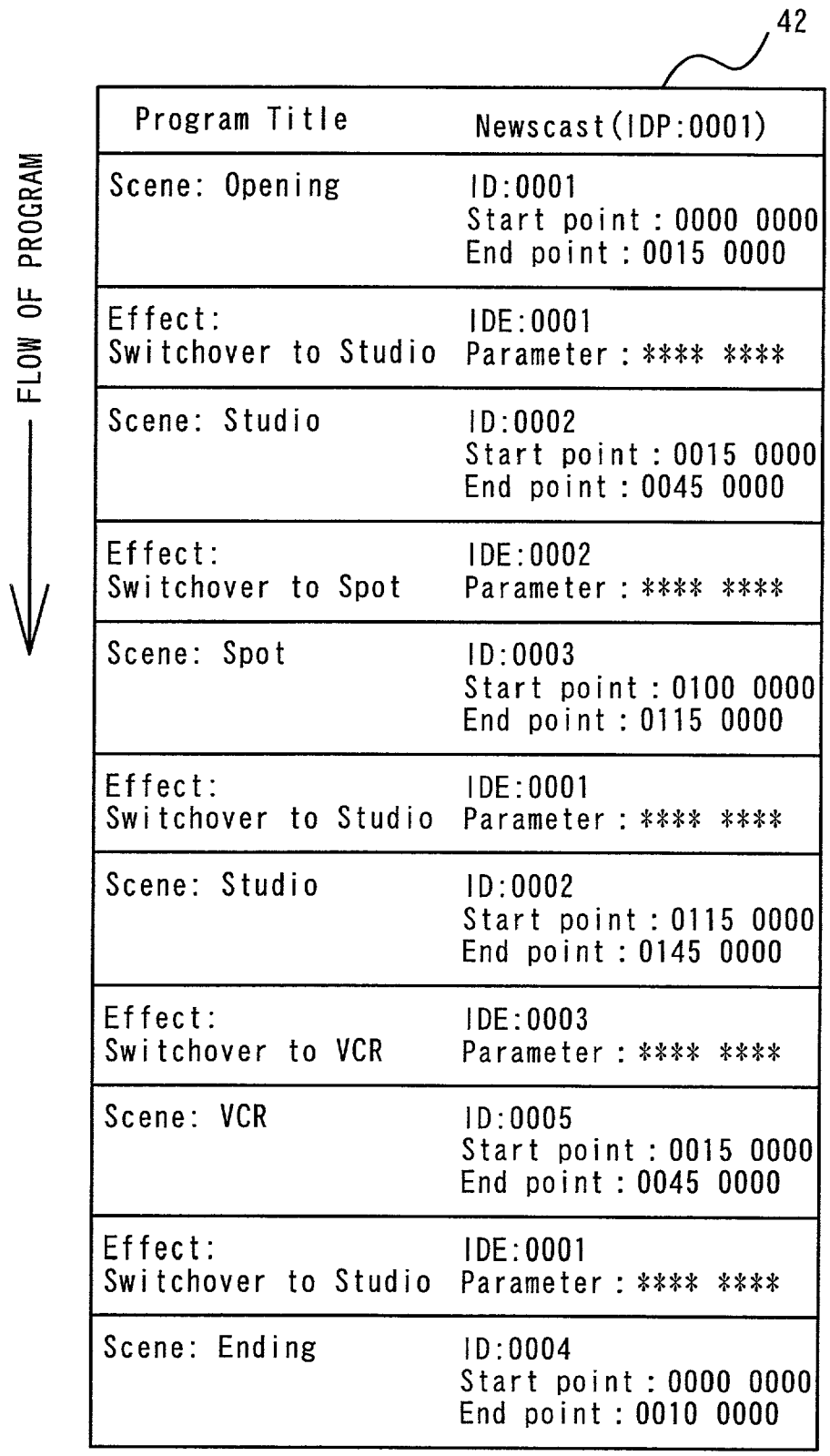
FIG. 8 shows an example of data stored in an editing management data memory included in the video editing apparatus of FIG. 4.

Referring back to FIG. 4, the functional blocks of the video editing apparatus are further discussed in detail. The editing management data memory 43 stores the motion video image data constituting the program and the transition effects applied in transition between different scenes or successive video clips. The transition effects are identified by the editing effect names registered in the effect setting table 44 by the editor. FIG. 8 shows an example of data stored in the editing management data memory 43. Here the motion video image data and the transition effects are specified in a time series. The program title and the corresponding index IDP are given to the editing management data. In the example of FIG. 8, the program title is 'Newscast' and the allocated index IDP is '0001'.

In this example, the program starts from the 'Opening' scene or video clip and switches to the 'Studio', 'Spot', 'VCR' video clips and further to the 'Ending' video clip. The transition effects specified by the editing effect names like 'Switchover to Studio' 'Switchover to Spot', and 'Switchover to VCR' are applied in the transition between the respective successive video clips. An index ID used to specify the video clip data is allocated to each video clip or scene in the image data memory 45 shown in FIG. 5. Data representing a start point and an end point are set to specify which part of the image data stored in the image data memory 45 is to be used. The start point and the end point are defined by the frame number and the time (second) of the image data.

The transition effects used in the program are identified by the editing effect names stored in the effect setting table 44 shown in FIG. 6. The index IDE allocated to the editing effect name in the effect setting table 44 and the parameters specifying, for example, the speed of transition, are given to each transition effect. In the editing management data, the information regarding the program title is given in the form of the index IDP. The transition effects to be applied at the respective positions are accordingly specified by the editing effect names and the indexes IDE allocated thereto in the effect setting table 44. The video editing apparatus of the embodiment generates the edited motion video image data according to the editing management data by means of the functional blocks discussed above. The functions of the respective functional blocks in the process of generating the edited motion video image data will be discussed later.

C. Display Screen

Figure 9:
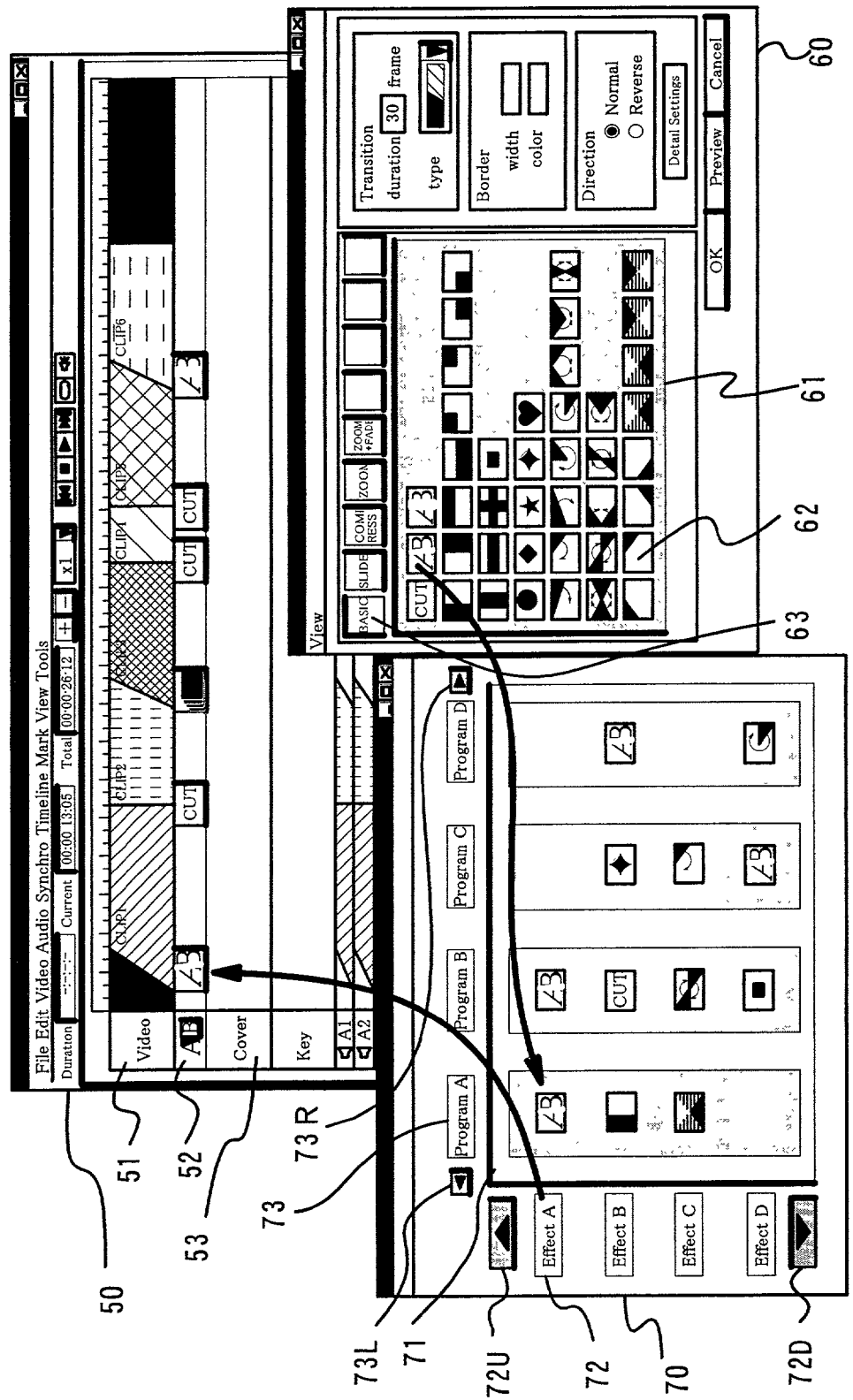
FIG. 9 shows an exemplified screen display to specify editing information required for editing a motion video.

The following describes the detailed process of setting the effect setting table and the editing management data as editing information of a motion video. In this embodiment, these data are set by utilizing a GUI on the display 11 of the computer 10. FIG. 9 shows an exemplified screen display to specify editing information required for editing a motion video. The CPU of the computer 10 executes a software program for editing a motion video on a predetermined operation system, so as to implement the screen display and the settings of the editing information. In this embodiment, the editing information is set by utilizing an editing window 50 for setting the editing management data, an effect setting window 70 for setting the contents of the effect setting table 44, and a transition effect window 60 for showing a list of available transition effects.

The transition effect window 60 is not editable by the user in principle and shows a list of transition effects available for editing a motion video in the form of icons 62. The icons 62 represent a variety of transition effects like wiping, sliding, and cutting. These icons 62 are classified into several groups and displayed in a transition effect field 61 included in the transition effect window 60. The displayed group is changed by clicking or otherwise operating one of field change buttons 63. In the example of FIG. 9, a group of transition effects belonging to a 'BASIC' group are displayed in a list. When the user clicks or operates a field change button 63 'SLIDE', another group of transition effects belonging to the 'SLIDE' group are displayed in a list.

The effect setting window 70 is arbitrarily editable by the user. The effect setting window 70 includes effect name boxes 72 for registering editing effect names, program title boxes 73 for registering program titles, and a transition effect setting field 71 for specifying the transition effect required for each selected pair of the editing effect name and the program title. As shown by the arrow, a desired icon 62 among those displayed in the transition effect window 60 is dragged and dropped with the mouse into the area corresponding to the selected pair of the editing effect name and the program title. This results in setting an arbitrary transition effect corresponding to the desired icon 62. The vacant area in the transition effect setting field 71 represents no setting of any transition effect. In the example of FIG. 9, there are four editing effect names and four program titles. The editing effect names are scrolled vertically by clicking or otherwise operating Up and Down buttons 72U and 72D. The program titles are scrolled horizontally by clicking or otherwise operating Slide buttons 73L and 73R. A greater number of editing effect names and program titles may be registered by scrolling. The pieces of information set in this manner are stored as the effect setting table 44 into the hard disk 15 or another suitable storage device.

The editing window 50 is arbitrarily editable by the user, and includes an editing bar 51 for specifying a main video film of the program, a transition effect setting bar 52 for specifying transition effects applied in the video film, and a cover image bar CB for setting a cover image superimposed on the main video film. Image data like CLIP1 and CLIP2 mainly constituting the program are specified in the editing bar 51. The length of each flip clip or image data is adjusted by varying the width on the editing bar 51. As shown by the arrow, a desired editing effect name box 72 among those displayed in the effect setting window 70 is dragged and dropped with the mouse into the transition effect setting bar 52. This results in setting an arbitrary transition effect corresponding to the desired editing effect name box 72. The parameters including the speed of transition are adjusted by varying the width of the selected transition effect. A cover image to be superimposed on the main video film is specified in the cover image bar CB in the same manner as in the editing bar 51. Examples of the cover image include telop (television opaque projector) or captions and an image presenting sponsors. The various pieces of information set in the editing window 50 are stored as the editing management data into the hard disk 15.

D. Generation of Edited Motion Video Image Data

The process of generating the edited motion video image data based on the various pieces of information set as discussed above is described with the functional blocks of FIG. 4. When an instruction of generating the edited motion video image data is input from the command input unit 40, the control unit 42 edits a motion video according to the following flow. The control unit 42 first gains access to the editing management data memory 43 and specifies the image data used in the program and the editing effect names applied in transition between different scenes or successive image data. The control unit 42 then gains access to the image data memory 45 and outputs predetermined image data to the channels CH1 and CH2 at timings specified by the editing management data. The control unit 42 also refers to the effect setting table 44 and translates the specified editing effect names to the transition effects to be applied in transition between the successive image data. Based on the results of the translation, the control unit 42 controls the switchover process memory 46 to output the control signals for attaining the transition effects corresponding to the editing effect names to the image editing unit 47. The image editing unit 47 causes the image data input through the channels CH1 and CH2 to be subjected to the specified transition effects in response to the input control signals from the switchover process memory 46, so as to generate edited motion video image data. The motion video image data thus generated are output via the data output unit 48 as recordable video signals or digital data storable into the hard disk 15.

Figure 10:
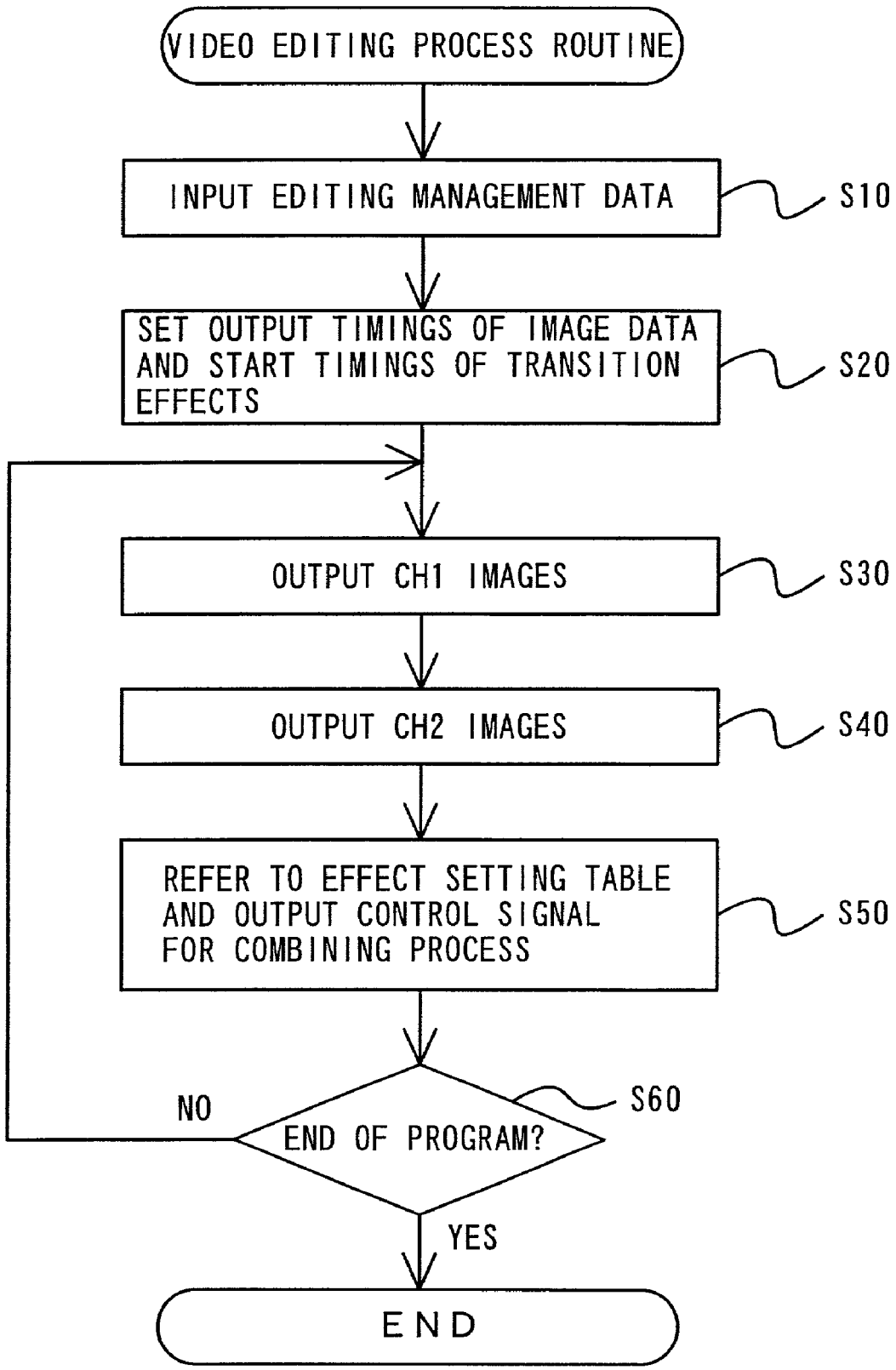
FIG. 10 is a flowchart showing a video editing process routine.

The above processing is implemented by the CPU of the computer 10 that executes a predetermined software program, that is, a video editing process routine. FIG. 10 is a flowchart showing the video editing process routine. When the program enters this routine, the CPU first receives the editing management data at step S10, and sets the output timings of the respective image data and the start timings of the respective transition effects based on the input editing management data at step S20. The CPU then outputs images to the channels CH1 and CH2 based on the input editing management data at steps S30 and S40. While a single motion video image is to be displayed, the image is output to only one of the channels CH1 and CH2, so that one of the processes of steps S30 and S40 is skipped. The images are output to both the channels CH1 and CH2 when transition is carried out between different scenes or successive image data with a selected transition effect like wiping or sliding or when telop or captions are superimposed on one image.

The CPU outputs the control signal with regard to the transition effect to the video editing board 21 at step S50, in combination with the output of the images. As discussed previously, the index IDE is allocated to each editing effect name in the editing management data. The CPU accordingly refers to the effect setting table 44 to specify the contents of the transition effect corresponding to the index IDE and the index IDP of the program title, and outputs the control signal stored in the switchover process memory 46. When no editing effect name is specified, the processing of step S50 is skipped practically.

The CPU repeats the above series of the processing until the end of the program, so as to complete the edited motion video image data at step S60. Although the processes of steps S30 through S50 are shown in this sequence in the flowchart of FIG. 10 for convenience of illustration, these processes may be carried out in a different sequence or in parallel.

E. Effects

Figure 11:
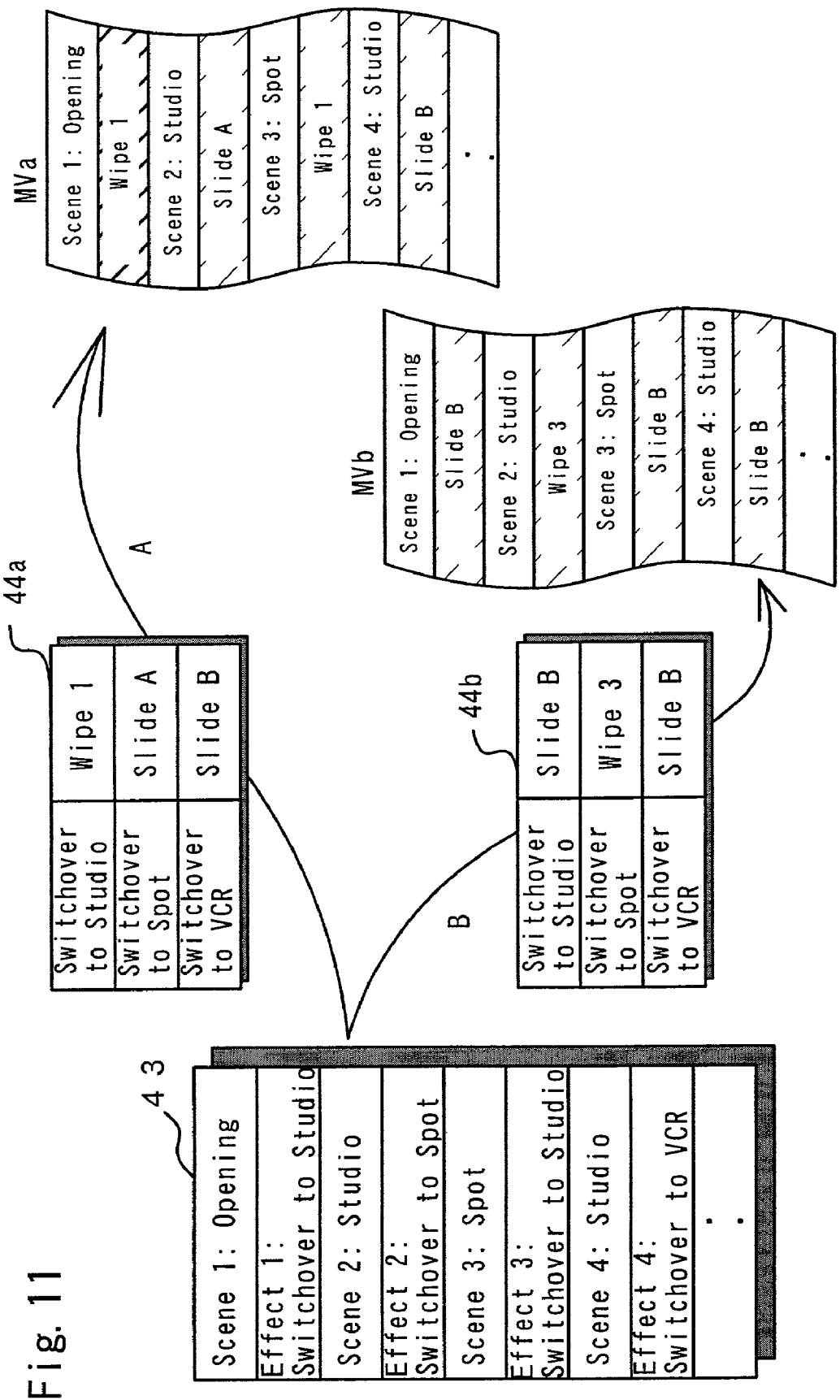
FIG. 11 shows a process of editing a motion video in the first embodiment.

The video editing apparatus of the embodiment utilizing the effect setting table as discussed above relieves the labor in the process of editing a motion video, especially in the process of setting the transition effects between different scenes or successive image data, and improves the certainty in this process. These effects are described in a concrete example. FIG. 11 shows a process of editing a motion video in the embodiment. This process edits a motion video, based on the editing management data shown in the left part of FIG. 11. Namely the process carries out the transition between each pair of successive scenes out of four scenes, that is, scene 1 'Opening', scene 2 'Studio', scene 3 'Spot', and scene 4 'Studio', with effect 1 'Switchover to Studio', effect 2 'Switchover to Spot', and effect 3 'Switchover to Studio', respectively. The same transition effect 'Switchover to Studio' is applied in both the effects 1 and 3.

In a first example, the mapping of the editing effect names to the transition effects is set in an effect setting table 44a. Namely the editing effect names 'Switchover to Studio', 'Switchover to Spot', and 'Switchover to VCR' are respectively mapped to the transition effects 'Wipe 1', 'Slide A', and 'Slide B'. The example of FIG. 11 shows the settings with regard to only one program. Edition of a motion video using this effect setting table 44a gives edited motion video image data MVa as shown by an arrow A. In the edited motion video image data MVa, the scene 'Opening' is switched over to the scene 'Studio' with the transition effect 'Wipe 1'. The scene is then switched over to the scene 'Spot' with the transition effect 'Slide A' and switched over again to the scene 'Studio' with the transition effect 'Wipe 1'.

In a second example, only the effect setting table 44a is replaced by another effect setting table 44b, while the editing management data 43 are kept unchanged. In the effect setting table 44b, the settings of the editing effect names 'Switchover to Studio' and 'Switchover to Spot' are respectively changed to the transition effects 'Slide B' and 'Wipe 3'. Edition of a motion video using this effect setting table 44b gives edited motion video image data MVb as shown by an arrow B. The transition effects after the scene 1 'Opening' and the scene 3 'Spot' are changed to 'Slide B', and the transition effect after the scene 2 'Studio' is changed to 'Wipe 3'.

As discussed above, in the video editing apparatus of the embodiment, the transition effects to be applied at the respective positions where a certain editing effect name is specified are changed collectively by simply varying the mapping of the editing effect names to the transition effects in the effect setting table. Compared with the arrangement of individually specifying the transition effect on each occasion of transition of the scene, this arrangement effectively relives the loading of the editing work. This arrangement also reduces the possible mistakes in the process of changing the transition effects and thereby improves the certainty of the editing work.

In many cases, a certain transition effect is applied uniformly at a plurality of different positions in the process of editing a program. Application of the transition effects is generally determined by trial and error. The technique of this embodiment specifies the transition effects indirectly by the effect setting table 44. This arrangement facilitates the collective change of a desired transition effect and thus relieves the loading of the editing work. The video editing apparatus of the embodiment is especially effective for the editing work that uses the same transition effect uniformly at a lot of different positions.

In this embodiment, the effect setting table 44 is a two-dimensional table as shown in FIG. 6. Namely the transition effect is specified by the editing effect name and the program title. Using the effect setting table 44 ensures the flexible settings of the transition effects and facilitates the application of the editing management data for different programs. For example, the editing management data set for a newscast may be applied in a talk show that uses the studio video films, the spot video films, and the VCR films in a similar flow. In this case, when the program title in the editing management data shown in FIG. 8 is changed from 'Newscast' to 'Talk show', the transition effects specified by the effect setting table 44 shown in FIG. 6 are changed. The transition effect applied in the transition to the studio is then immediately changed from 'Wipe 1' to 'Slide C'. The indexes ID used to specify the respective video clip data or image data are also changed to the indexes for the talk show in the editing management data. This gives the edited motion video image data for the talk show.

F. Modifications

Figure 13:
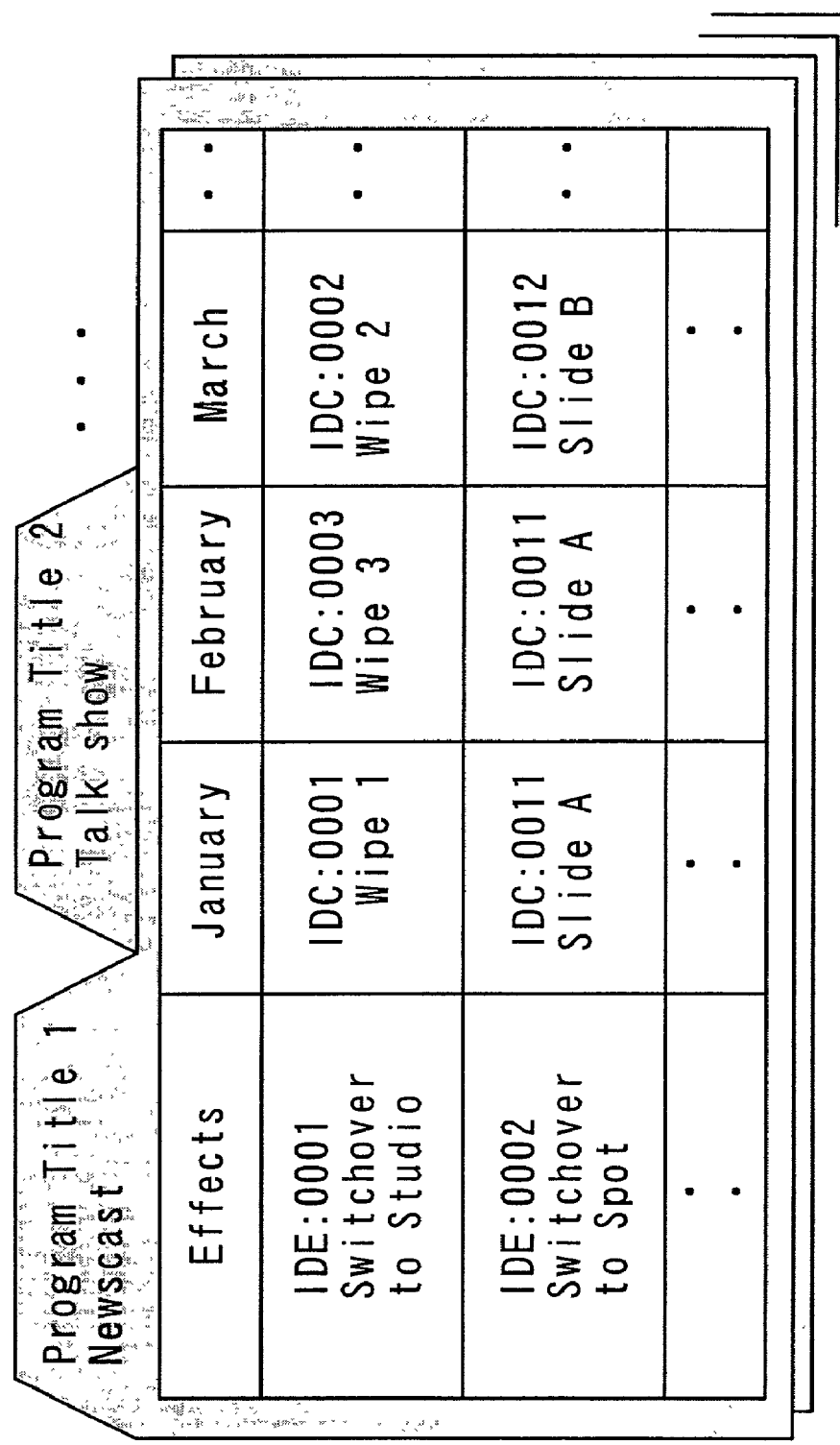
FIG. 13 shows a second modification of the effect setting table.

The effect setting table 44 is not restricted to the format discussed in the above embodiment. FIG. 12 shows a fist modification of the effect setting table. The first modification represents the settings of a one-dimensional table. In this table of the first modification, the editing effect name is one-to-one mapped to the transition effect, irrespective of the program title. FIG. 13 shows a second modification of the effect setting table. The second modification represents the settings of a three-dimensional table. In this table of the second modification, the transition effect is specified by three parameters including the month like January or February in addition to the editing effect name and the program title. This application advantageously enables the transition effects to be set more flexibly according to the month or season. Any dimensional table is applicable for the effect setting table 44, as long as the table has a configuration that is capable of indirectly specifying the transition effects. In the case of the two, three, and greater dimensional tables, a variety of parameters other than the editing effect name, the program title, and the month are applicable for the indirect specification.

G. Second Embodiment

The following describes another video editing apparatus in a second embodiment of the present invention. The video editing apparatus of the first embodiment indirectly specifies the transition effect on each occasion of transition of the scene by the effect setting table 44. The video editing apparatus of the second embodiment, on the other hand, indirectly specifies a cover image to be superimposed on a main video film, for example, telop or an image presenting sponsors. The second embodiment has the same hardware structure as that of the first embodiment (see FIGS. 2 and 3), but has different functional blocks to attain the different functions as mentioned above.

Figure 14:
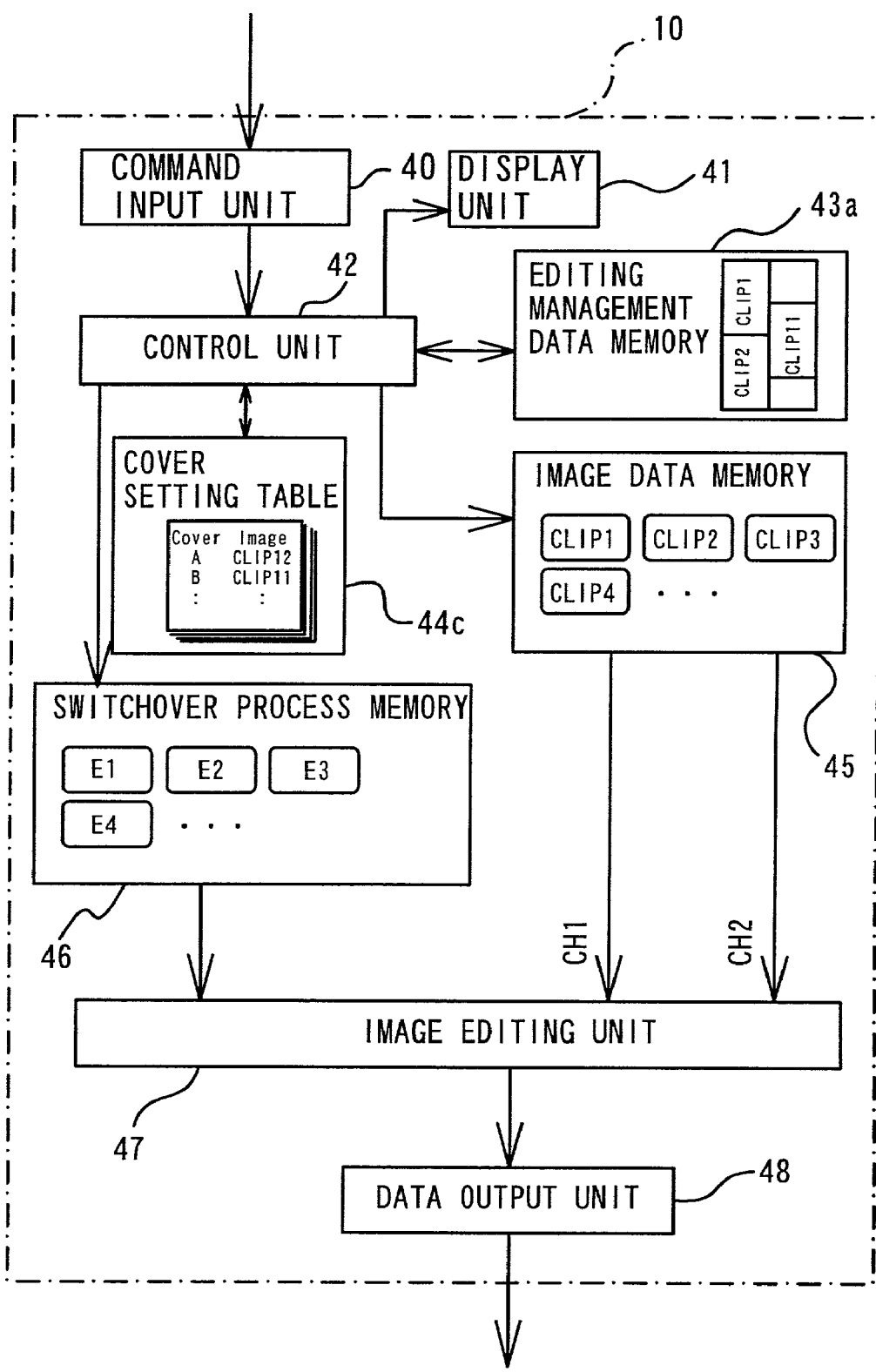
FIG. 14 shows functional blocks of another video editing apparatus in a second embodiment of the present invention.

FIG. 14 shows functional blocks in the video editing apparatus of the second embodiment. The differences from the first embodiment (see FIG. 4) include a cover setting table 44c used in place of the effect setting table 44, the format of data stored in an editing management data memory 43a, and flow paths of signals in the process of editing a motion video.

FIG. 15 shows an example of data stored in the cover setting table 44c. In the example of FIG. 15, 'Sponsor', 'Appearance', and 'Caption' are set as cover image names. Indexes ID2 are allocated to the respective cover image names. As in the case of the effect setting table 44 of the first embodiment, the program title is identified by the index IDP. In the cover setting table 44c, each cover image is specified by the program title and the color image name arbitrarily set by the user. For example, the program title 'Newscast' and the cover image name 'Sponsor' specify image data 'Sponsor A' as the cover image. Cover image data to be superimposed are stored with the main image data of the program in the image data memory 45. The indexes ID in the cover setting table 44c are used to specify the cover image data on the image data memory 45. When a still video image is used for the cover image, the technique of the second embodiment generates cover image data of the still video image similar to those of the motion video image and carries out the processing in a similar manner. One-frame image data for a still video image may alternatively be applied in the cover image. In the latter case, attribute data representing a still video image is stored together with the index ID for specifying the image data in the cover setting table 44c. The application of the data output from the image data memory 45 is changed according to the attribute data.

FIG. 16 shows an example of the editing management data in the second embodiment. The second embodiment adopts a specific data structure that is capable of specifying both main image data and cover image data in a time series as shown in FIG. 16, in order to allow the cover image data to be superimposed on the main image data. As in the case of the first embodiment, the main image data has the index, the start point, and the end point specified for each scene like 'Opening', 'Studio', or 'Ending'. Although the transition effects applied on the respective occasions of transition of the scene are omitted from the illustration of FIG. 16, each scene may be switched over to another scene with the specified transition effect as discussed in the first embodiment.

The cover image data specifies the type of the image to be superimposed. More specifically, the cover image data does not directly set the cover images, but specifies the cover image names registered in the cover setting table 44c. In the example of FIG. 16, cover 1 'Sponsor', cover 2 'Caption', and cover 3 'Appearance' are specified as the cover image names. Each cover image name has the index ID2 registered in the cover setting table 44c, as well as parameters regarding superimposition, for example, the start point and the end point of the superimposition. These parameters may further include the location and the size of the superimposition.

These settings are performed in the screen display shown in FIG. 9 in a similar manner to that discussed in the first embodiment. The cover setting table 44c is displayed in a similar format to that of the effect setting window 70 shown in FIG. 9. Cover image names are shown in the editing effect name boxes 72, and one scene of each corresponding cover image is displayed as a contracted image in the transition effect field 71. The cover images are registered in the cover setting table 44c by dragging and dropping a desired image among available images displayed in a contracted manner, in place of the icons in the transition effect window 60 of the first embodiment, into each area of the cover setting table 44c. The names and the indexes of available images may be directly input from the keyboard.

The cover images in the editing management data are set on a cover image setting bar 53 shown in FIG. 9. A desired cover image is specified by dragging and dropping the corresponding cover image name among those registered in the window 70 with the mouse. Like the operations on the editing bar 51, the insertion time of each cover image may be adjusted by varying the width on the cover image setting bar 53.

When an instruction for generating the edited motion video image data is input after the settings of the various pieces of editing information, the control unit 42 carries out the edition of a motion video in the same flow as discussed in the first embodiment. Whereas the technique of the first embodiment refers to the effect setting table 44 to specify the transition effects, the technique of the second embodiment refers to the cover setting table 44c to specify the cover images. After the specification of cover images, the control unit 42 gains access to the image data memory 45 and outputs each of the specified cover images to either the channel CH1 or the channel CH2 at a timing specified by the editing management data. The control unit 42 also controls the image editing unit 47 via the switchover process memory 46 simultaneously with this timing to output a control signal for superimposing the images of the channels CH1 and CH2 one upon the other.

The video editing apparatus of the second embodiment readily and accurately changes the cover images by the indirect specification technique. For example, when there is any change in the sponsors or the appearances of the program, the edited motion video image data are readily changed by varying the mapping stored in the cover setting table 44c. In the case where an image presenting the sponsors or the appearances is inserted at a plurality of different positions of the program, this arrangement enables the image to be changed collectively, thus improving the working efficiency and the certainty of the changing work. The video editing apparatus of the second embodiment uses the cover setting table that specifies each cover image in a two-dimensional manner by the cover image name and the program title. This arrangement ensures the flexible settings of the cover images and facilitates the application of the editing management data for different programs. When the editing management data set for one program are used for another program, the video editing apparatus of the second embodiment enables the cover images to be changed immediately by simply changing the program title in the editing management data.

Like the modifications of the effect setting table discussed in the first embodiment with FIGS. 12 and 13, the cover setting table may be any dimensional table, for example, a one-dimensional table or a three-dimensional table, as long as the table has an arrangement that is capable of indirectly specifying the cover images.

H. Third Embodiment

The following describes still another video editing apparatus in a third embodiment of the present invention. The video editing apparatus of the third embodiment indirectly specifies intermediate images like advertising films, commercials, and spots to be inserted into successive video clips of a main video film. The third embodiment has the same hardware structure as that of the first embodiment (see FIGS. 2 and 3), but has different functional blocks to attain the different functions as mentioned above.

Figure 17:
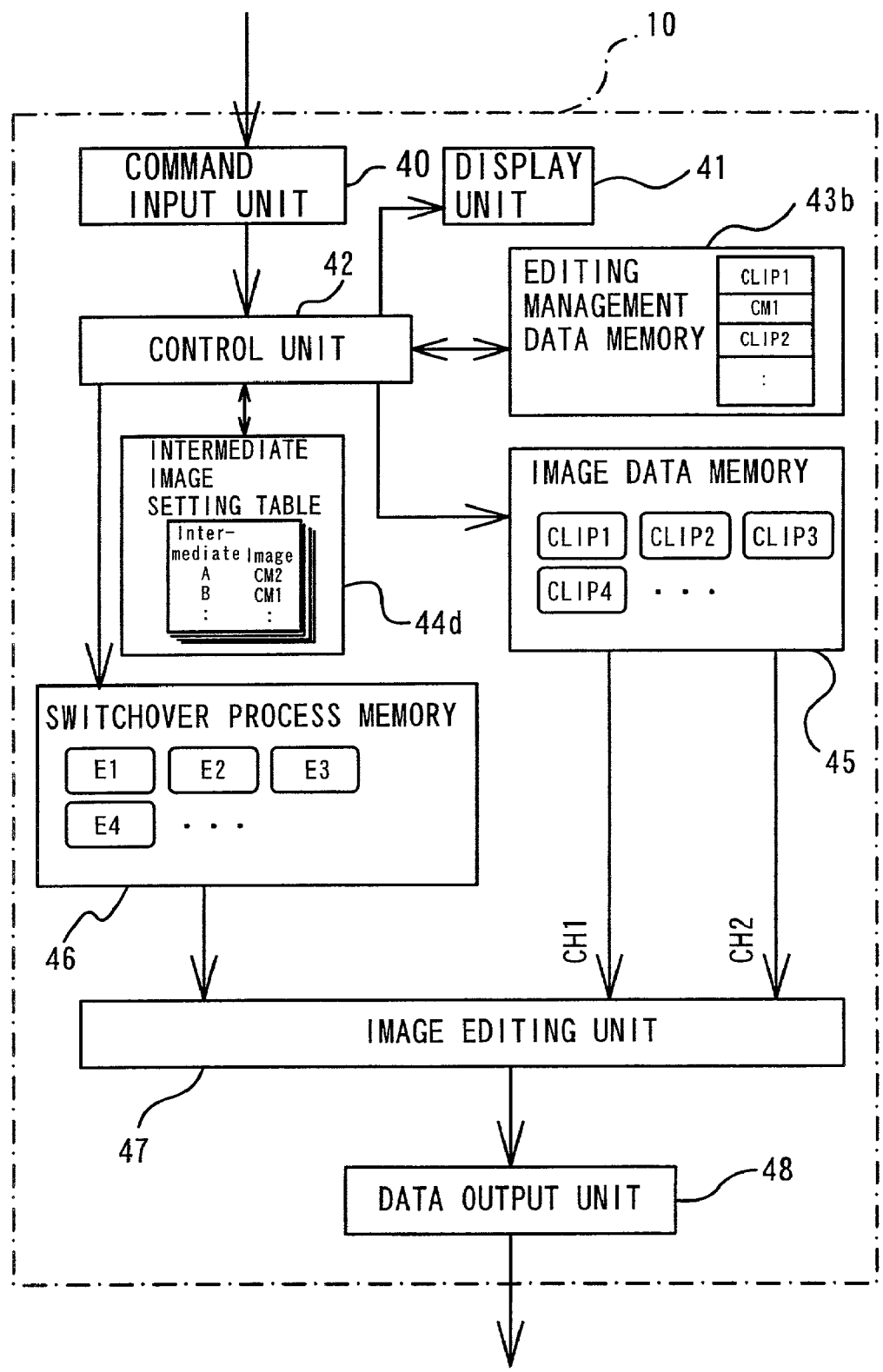
FIG. 17 shows functional blocks of still another video editing apparatus in a third embodiment of the present invention.

FIG. 17 shows functional blocks in the video editing apparatus of the third embodiment. The main differences from the first embodiment (see FIG. 4) is a intermediate image setting table 44d used in place of the effect setting table 44.

FIG. 18 shows an example of data stored in the intermediate image setting table 44d. In the example of FIG. 18, 'Sponsor A', 'Sponsor B', and 'Sponsor C' are set as intermediate image names, and two different tables 44d1 and 44d2 are provided for Tokyo and Osaka locals. An index ID3 is allocated to each intermediate image name, and each intermediate image has an index Icm for specifying the image data on the image data memory 45.

Figure 19:
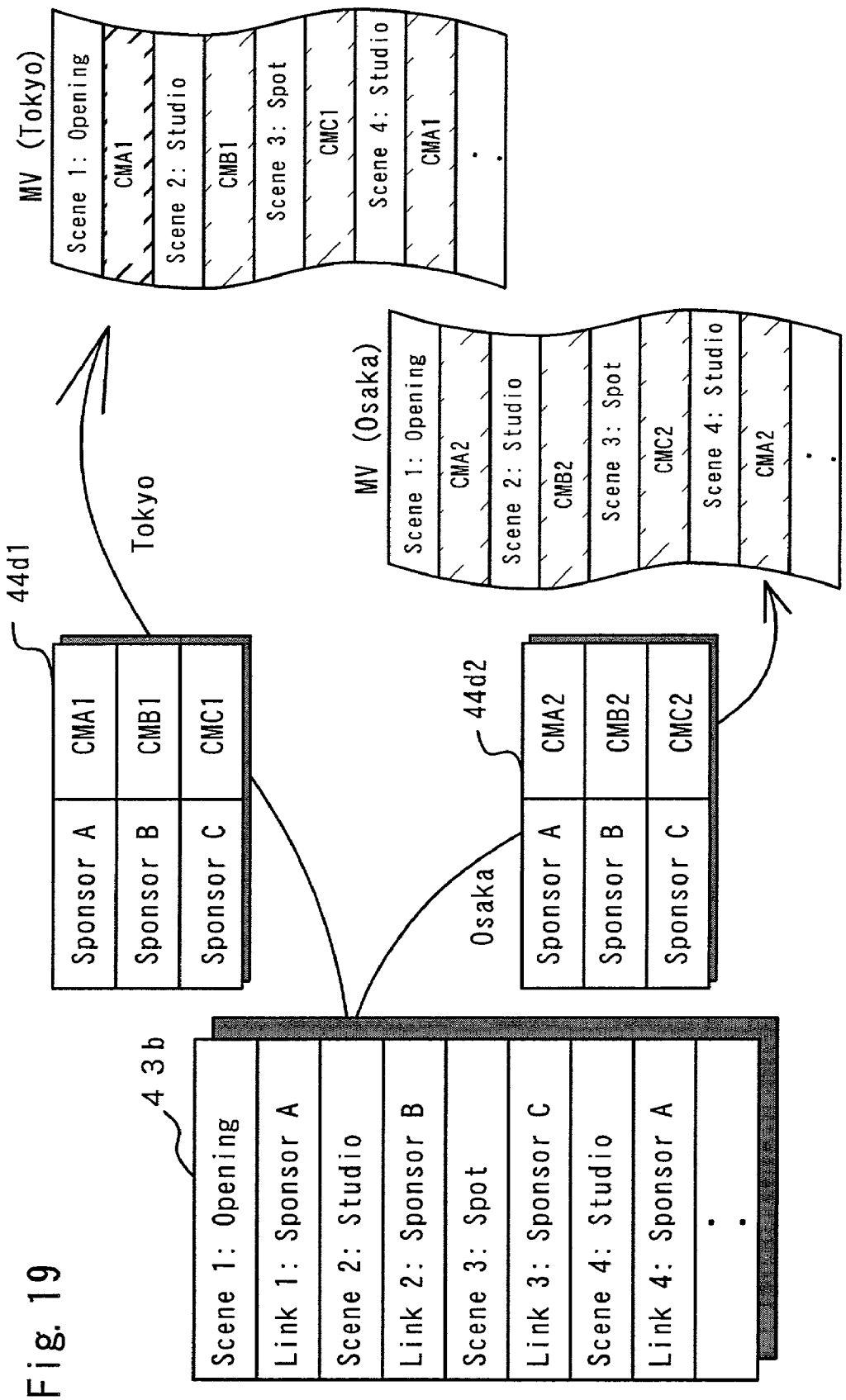
FIG. 19 shows a process of editing a motion video in the third embodiment.
Figure 20:
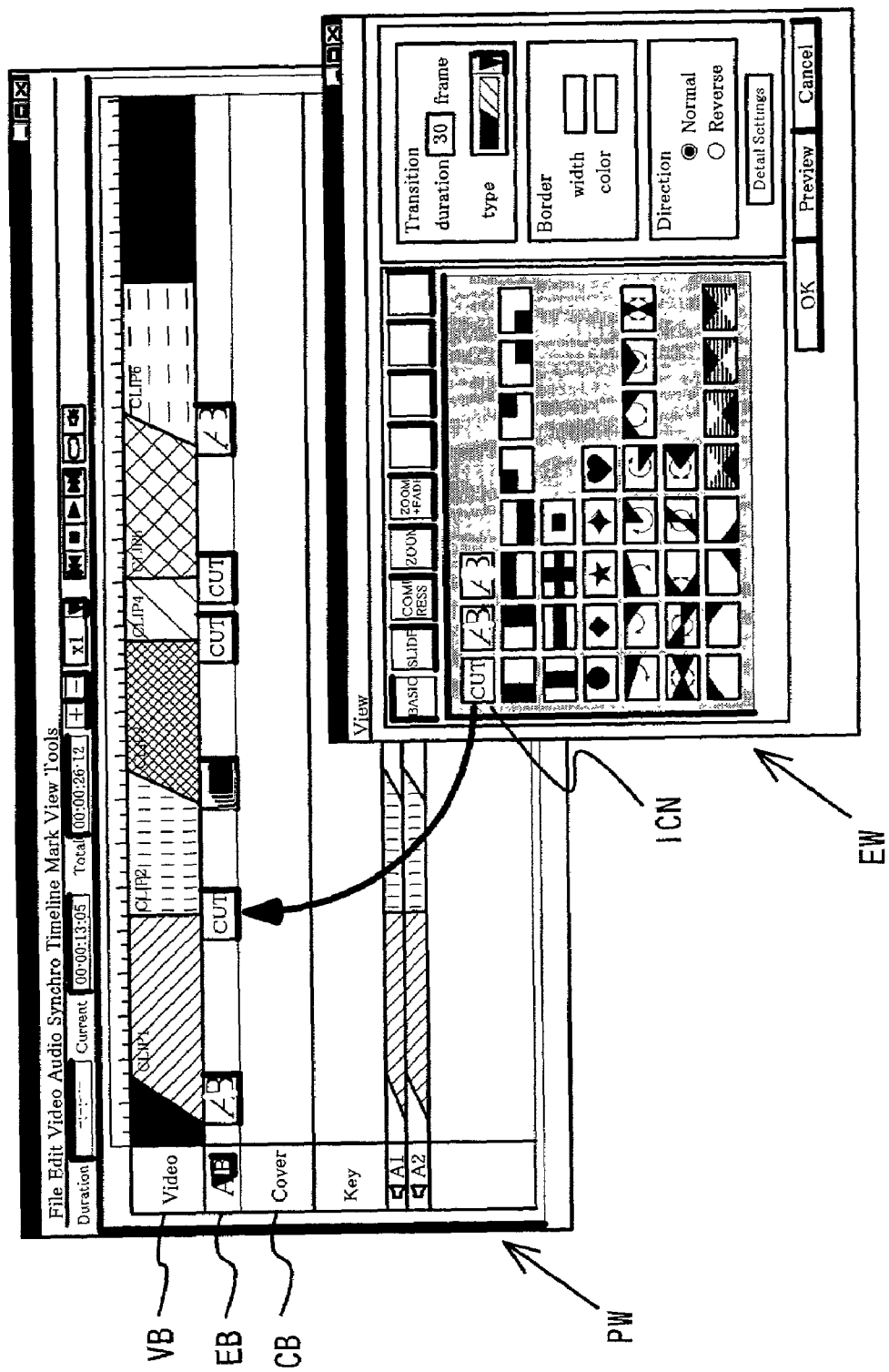
FIG. 20 shows a prior art process of non-linear editing.

FIG. 19 shows a process of editing a motion video in the third embodiment. The edited motion video image data for each local are generated by selectively using the intermediate image setting table 44d1 for Tokyo local and the intermediate image setting table 44d2 for Osaka local shown in FIG. 18.

An editing management data memory 43b stores the editing management data, which are set to insert intermediate images Link 1 through Link 4 in between the respective successive main image data of scenes 1 through 4 as shown in FIG. 19. In the third embodiment, the intermediate images are commercials. The intermediate image names of 'Sponsor A', 'Sponsor B', and 'Sponsor C' are allocated to the intermediate images Link 1 through Link 4.

The video editing apparatus of the third embodiment generates the edited motion video image data based on the editing management data according to a similar procedure to that discussed in the first embodiment. The intermediate image setting table 44d1 is used in the case of editing a program for Tokyo local. Linking images CMA1 through CMC1 are accordingly substituted in the intermediate image names 'Sponsor A' through 'Sponsor C' in the editing management data, and edited motion video image data MV (Tokyo) is completed.

In the case of editing a program for Osaka local, on the other hand, the intermediate image setting table 44d2 is used. Linking images CMA2 through CMC2 are accordingly substituted in the intermediate image names 'Sponsor A' through 'Sponsor C' in the editing management data, and edited motion video image data MV (Osaka) is completed. The mapping of the intermediate image names ('Sponsor A' through 'Sponsor C') to the actual sponsors in the table 44d1 may be different from the mapping in the table 44d2. For example, the intermediate image name 'Sponsor A' may be mapped to different sponsors respectively running the commercial CMA1 for Tokyo local and the commercial CMA2 for Osaka local.

The video editing apparatus of the third embodiment enables the intermediate images inserted in the edited motion video image data to be readily changed by simply varying the mapping stored in the intermediate image setting table 44d. As illustrated in FIG. 19, the commercials may be changed in the respective locals where the program is broadcasted. This arrangement enables the edited motion video image data to be readily generated when each local station has different sponsors for the same program.

The third embodiment regards the case in which different intermediate images are used in two different locals. The same technique is applicable to the case in which different intermediate images are used in three or more different locals. The intermediate images may be changed depending upon a variety of parameters other than the local, for example, the time zone and the season when the program is broadcasted. The intermediate images are not restricted to the commercials, spots, or advertising films. Other available examples of the intermediate image include blackout images and other effect images inserted for a very short time period on the occasions of transition between different scenes or successive video clips, images presenting the appearances or the cast, and the title credits.

In the structure of the third embodiment, the intermediate image setting table stores the mapping of the intermediate image names to the intermediate image data. The intermediate image setting table 44d may alternatively store the mapping of the intermediate image names to a variety of parameters relating to the insertion of the intermediate images, for example, the insertion time of each intermediate image and the screen effect applied at the time of insertion. When a blackout image is used as the intermediate image, for example, the length of blackout is readily varied by changing the parameters.

The arrangement of any of the video editing apparatuses discussed above enables the transition effects of the scenes, the cover images, or the intermediate images to be specified indirectly. This relieves the labor in the process of editing a motion video and improves the certainty of the process, thus significantly enhancing the usability of the video editing apparatus. The target of the indirect specification is not restricted to the transition effect, the cover image, or the intermediate image. The target of the indirect specification may be a variety of other conditions that are used uniformly at a plurality of different positions in one program and have a fair chance of the change in the editing process. For example, the adjustment of the lightness or the tone applied in the motion video images may be specified indirectly.

Any of the embodiments discussed above refers to the effect setting table or the equivalent table and specifies the transition effects, the cover images, or the intermediate images to generate the edited motion video image data. One possible modification refers to the effect setting table, generates intermediate editing management data including the specified transition effects, and edits a motion video based on the intermediate editing management data. Generation of the intermediate editing management data relieves the loading of the editing work, while satisfying the real-time requirements in the course of generating the edited motion video image data.

The present invention is not restricted to the above embodiments or their modifications, but there may be many other modifications, changes, and alterations without departing from the scope or spirit of the main characteristics of the present invention. The configurations and the functions of the first through the third embodiments may be combined with one another. The contents of the effect setting table may be all defined by the user or customized by the user with a preset template. It is desirable that a plurality of different templates are provided for different types of motion videos. The series of the processing executed by the software in the above embodiments may be attained by the hardware configuration, or vice versa.

The scope and spirit of the present invention are limited only by the terms of the appended claims.

What is claimed is:

1. A video editing apparatus that combines a plurality of image data including at least one motion video image data to generate a series of edited motion video image data, said video editing apparatus comprising:

an image data memory that stores the plurality of image data;

an effect data memory that stores a plurality of effect data, wherein each of the plurality of effect data specifies an editing effect applicable to one or more of the plurality of image data;

an effect setting memory that stores mapping data which represents correspondence between an editing effect name and an effect data specifier specifying one of the plurality of the effect data;

an editing management data memory that stores editing management data, which specifies a sequence of the image data and the editing effect name in time series;

an image editing unit that applies the editing effect, which is indirectly referred by the editing effect name using the mapping data stored in the effect setting memory, to the image data according to the editing management data and generates the series of edited motion video image data; and a modification unit that enables a user to modify the mapping data stored in said effect setting memory, so as to modify the correspondence between the editing effect name and the effect data specifier.

2. A video editing apparatus in accordance with claim 1, wherein the editing effect includes a screen effect provided in advance to be applicable for the image data.

3. A video editing apparatus in accordance with claim 2, wherein the screen effect represents processing applied in a plurality of image data of interest, and said mapping data relates the effect data specifier to at least one of a type of processing for the corresponding editing effect and the plurality of image data of interest to be processed.

4. A video editing apparatus in accordance with claim 3, wherein the screen effect includes a transition effect applied in a process of switching from one image data to another image data.

5. A video editing apparatus in accordance with claim 3, wherein the screen effect represents superimposing of an auxiliary image on part of a main image, and
said effect setting memory stores mapping of the effect data specifier to a type of the auxiliary image.

6. A video editing apparatus in accordance with claim 5, wherein the auxiliary image data is a caption.

7. A video editing apparatus in accordance with claim 1, wherein the editing effect represents insertion of a separately provided intermediate image between the plurality of image data included in the series of edited motion video image data.

8. A video editing apparatus in accordance with claim 7, wherein said effect setting memory stores mapping of the effect data specifier to the intermediate image.

9. A video editing apparatus in accordance with claim 1, wherein said effect setting memory stores mapping of a plurality of parameters including the editing effect name to the editing effect.

10. A video editing apparatus in accordance with claim 1, wherein said effect setting memory has an effect setting template in which a predetermined editing effect name is mapped to a predetermined editing effect.

11. A video editing apparatus that combines a plurality of image data including at least one motion video image data to generate a series of edited motion video image data, said video editing apparatus comprising:
an effect setting display unit that displays mapping data which represents correspondence between an editing effect name and an effect data specifier specifying one of a plurality of effect data, each of the plurality of effect data specifying an editing effect applicable to one or more of the plurality of image data;
an editing management data setting unit that enables a user to set editing management data, which specifies a sequence of the image data and the editing effect name in time series; and
an effect modification unit that enables a user to modify the mapping data, so as to change the editing effect to be applied in the series of edited motion video image data.

12. A video editing method for combining a plurality of image data including at least one motion video image data with one another to generate a series of edited motion video image data, said video editing method comprising the steps of:
(a) providing the plurality of image data;
(b) enabling a user to edit an effect setting table that specifies mapping data which represents correspondence between an editing effect name and an effect data specifier specifying one of a plurality of effect data, each of the plurality of effect data specifying an editing effect applicable to one or more of the plurality of image data;
(c) setting editing management data that specifies a sequence of the image data and the editing effect name in time series; and
(d) applying the editing effects, which is indirectly referred by the editing effect name using the mapping data provided, to the image data according to the editing management data specified in said effect setting table and generates the series of edited motion video image data.

13. A video editing method in accordance with claim 12, wherein the editing effect includes a transition effect applied in a process of switching from one image data to another image data.

14. A video editing method in accordance with claim 12, wherein the editing effect represents superimposing of an auxiliary image on part of a main image, and
said effect setting table specifies mapping of the effect data specifier to a type of the auxiliary image.

15. A video editing method in accordance with claim 12, wherein the editing effect represents insertion of a separately provided intermediate image between the plurality of image data included in the series of edited motion video image data, and
said effect setting table specifies mapping of the effect data specifier to the intermediate image.

16. A computer readable recording medium, in which a specific program is recorded to combine a plurality of image data including at least one motion video image data with one another, so as to generate a series of edited motion video image data, said specific program causing a computer to attain the functions of:
controlling output of the plurality of image data stored in advance;
editing an effect setting table that specifies mapping data which represents correspondence between an editing effect name and an effect data specifier specifying one of a plurality of effect data, each of the plurality of effect data specifying an editing effect applicable to one or more of the plurality of image data;
setting editing management data that specifies a sequence of the image data and the editing effect name in time series; and
controlling output of the image data according to the editing management data, and controlling execution of the editing effect based on the mapping data specified in said effect setting table.

17. A recording medium in accordance with claim 16, wherein the editing effect comprises a transition effect applied in a process of switching from one image data to another image data.

18. A recording medium in accordance with claim 16, wherein the editing effect represents superimposing of an auxiliary image on part of a main image, and
said effect setting table specifies mapping of the effect data specifier to a type of the auxiliary image data.

19. A recording medium in accordance with claim 16, wherein the editing effect represents insertion of a separately provided intermediate image between the plurality of image data included in the series of edited motion video image data, and
said effect setting table specifies mapping of the effect data specifier to the intermediate image.

20. A computer readable recording medium, in which a specific program is recorded to combine a plurality of image data including at least one motion video image data with one another, so as to generate a series of edited motion video image data,
an effect setting table being further recorded in said computer readable recording medium, said effect setting table being editable and used in a process of generating the series of edited motion video image data to specify mapping data which represents correspondence between a predetermined editing effect name and an effect data specifier specifying one of a plurality of effect data, each of the plurality of effect data specifying an editing effect applicable to one or more of the plurality of image data.

21. A computer readable recording medium, in which a specific program is recorded to combine a plurality of image data including at least one motion video image data with one another, so as to generate a series of edited motion video image data, said specific program causing a computer to attain the functions of:

displaying an effect setting table that specifies mapping data which represents correspondence between an editing effect name and an effect data specifier specifying one of a plurality of effect data, each of the plurality of effect data specifying an editing effect applicable to one or more of the plurality of image data;

setting editing management data that specifies a sequence of the image data and the editing effect name in time series; and changing the editing effect to be applied in the series of edited motion video image data in response to a modification of the mapping data.

* * * * *